US009076278B2

(12) United States Patent
Hansen

(10) Patent No.: US 9,076,278 B2
(45) Date of Patent: Jul. 7, 2015

(54) AUTOMATED TIMING SYSTEMS AND METHODS HAVING MULTIPLE TIME EVENT RECORDERS AND AN INTEGRATED USER TIME ENTRY INTERFACE

(75) Inventor: Kurt S. Hansen, Chesterfield, MO (US)

(73) Assignee: Innovative Timing Systems, LLC, St. Louis, MO (US)

( * ) Notice: Subject to any disclaimer, the term of this patent is extended or adjusted under 35 U.S.C. 154(b) by 777 days.

(21) Appl. No.: 13/194,880

(22) Filed: Jul. 29, 2011

(65) Prior Publication Data

US 2012/0025944 A1 Feb. 2, 2012

Related U.S. Application Data

(60) Provisional application No. 61/369,013, filed on Jul. 29, 2010.

(51) Int. Cl.
  G05B 23/02 (2006.01)
  G07C 1/24 (2006.01)

(52) U.S. Cl.
  CPC ........................................ *G07C 1/24* (2013.01)

(58) Field of Classification Search
  None
  See application file for complete search history.

(56) References Cited

U.S. PATENT DOCUMENTS

| | | | |
|---|---|---|---|
| 4,142,680 A | | 3/1979 | Oswald et al. |
| 4,505,595 A | * | 3/1985 | Rose et al. ..................... 368/110 |
| 4,812,845 A | | 3/1989 | Yamada et al. |
| 4,918,630 A | * | 4/1990 | Plouff et al. .................. 702/178 |
| 5,091,895 A | | 2/1992 | Chatwin et al. |
| 5,140,307 A | | 8/1992 | Rebetez et al. |

(Continued)

FOREIGN PATENT DOCUMENTS

| | | |
|---|---|---|
| EP | 2009595 A | 12/2008 |
| JP | 2008-276353 A | 11/2006 |

(Continued)

OTHER PUBLICATIONS

PCT Search Report, PCT US 2010-022559, Jan. 29, 2010.

(Continued)

*Primary Examiner* — Curtis King
(74) *Attorney, Agent, or Firm* — Polster Lieder

(57) ABSTRACT

Systems and methods for timing of a passing of an object past a monitored location where the monitored location is being monitored by timing system having at least one automated object detection system for wirelessly detecting the passing of the object at the monitored location. The system comprises a remote entry computer system having a processor for executing computer executable instructions, a clock for determining a present time, a user interface for receiving user input data, a memory being a computer readable medium storing the computer executable instructions and the received user input data, and a communications interface for communicating with the timing system. The system includes a computer readable medium including the computer executable instructions for performing the method of receiving the user input data at the user interface, receiving from the clock a user data input time associated with the receipt of the received user input data at the user interface, and storing the received user input data and the user data input time in the memory. The computer executable instructions also include the method of creating a received user data message including the stored user input data and a time value as a datagram message and transmitting the user data message over the communications interface to the timing system.

37 Claims, 8 Drawing Sheets

(56) References Cited

U.S. PATENT DOCUMENTS

| | | | |
|---|---|---|---|
| 5,436,611 | A | 7/1995 | Arlinghaus, Jr. |
| 5,493,805 | A | 2/1996 | Penuela et al. |
| 5,511,045 | A | 4/1996 | Sasaki et al. |
| 5,604,485 | A | 2/1997 | Lauro et al. |
| 5,696,481 | A | 12/1997 | Pejas et al. |
| 5,812,049 | A | 9/1998 | Uzi |
| 5,821,902 | A | 10/1998 | Keen |
| 5,883,582 | A | 3/1999 | Bowers et al. |
| 5,973,598 | A | 10/1999 | Beigel |
| 6,008,773 | A | 12/1999 | Matsuoka et al. |
| 6,100,804 | A | 8/2000 | Brady et al. |
| 6,204,813 | B1 | 3/2001 | Wadell et al. |
| 6,278,413 | B1 | 8/2001 | Hugh et al. |
| 6,340,932 | B1 | 1/2002 | Rodgers et al. |
| 6,369,697 | B1 | 4/2002 | Poole |
| 6,466,178 | B1 | 10/2002 | Muterspaugh |
| 6,496,806 | B1 | 12/2002 | Horwitz et al. |
| 6,512,478 | B1 | 1/2003 | Chien |
| 6,570,487 | B1 | 5/2003 | Steeves |
| 6,577,238 | B1 | 6/2003 | Whitesmith et al. |
| 6,696,954 | B2 | 2/2004 | Chung |
| 6,703,935 | B1 | 3/2004 | Chung et al. |
| 6,710,713 | B1 | 3/2004 | Russo |
| 6,720,930 | B2 | 4/2004 | Johnson et al. |
| 6,812,824 | B1 | 11/2004 | Goldinger et al. |
| 6,839,027 | B2 | 1/2005 | Krumm et al. |
| 6,888,459 | B2 | 5/2005 | Stilp |
| 6,888,502 | B2 | 5/2005 | Beigel et al. |
| 6,952,157 | B1 | 10/2005 | Stewart et al. |
| 6,963,270 | B1 | 11/2005 | Gallagher, III et al. |
| 6,989,750 | B2 | 1/2006 | Shanks et al. |
| 6,995,655 | B2 | 2/2006 | Ertin et al. |
| 7,009,562 | B2 | 3/2006 | Jenabi |
| 7,019,639 | B2 | 3/2006 | Stilp |
| 7,057,511 | B2 | 6/2006 | Shanks et al. |
| 7,057,975 | B2 | 6/2006 | Stobbe |
| 7,339,478 | B2 | 3/2008 | Le |
| 7,508,739 | B2 | 3/2009 | Paes |
| 7,589,616 | B2 | 9/2009 | Klatsmanyi et al. |
| 7,605,685 | B2 | 10/2009 | Stewart et al. |
| 7,605,689 | B2 | 10/2009 | Hein et al. |
| 8,085,136 | B2 | 12/2011 | Stewart et al. |
| 8,179,233 | B2 | 5/2012 | Kia |
| 2001/0040895 | A1 | 11/2001 | Templin |
| 2002/0008624 | A1 | 1/2002 | Paek |
| 2002/0044057 | A1 | 4/2002 | Zirbes |
| 2002/0044096 | A1 | 4/2002 | Chung |
| 2003/0014678 | A1 | 1/2003 | Ozcetin et al. |
| 2003/0073518 | A1 | 4/2003 | Marty et al. |
| 2003/0163287 | A1 | 8/2003 | Vock et al. |
| 2003/0189484 | A1 | 10/2003 | Rust et al. |
| 2004/0006445 | A1 | 1/2004 | Paek |
| 2005/0099269 | A1 | 5/2005 | Diorio et al. |
| 2006/0097847 | A1 | 5/2006 | Bervoets et al. |
| 2006/0097874 | A1 | 5/2006 | Salesky et al. |
| 2006/0103536 | A1 | 5/2006 | Kwak et al. |
| 2006/0176216 | A1 | 8/2006 | Hipskind |
| 2007/0076528 | A1 | 4/2007 | Kirby |
| 2007/0097969 | A1 | 5/2007 | Regnier |
| 2007/0182567 | A1 | 8/2007 | Stewart et al. |
| 2007/0252770 | A1 | 11/2007 | Kai et al. |
| 2007/0262871 | A1 | 11/2007 | Yamagajo et al. |
| 2007/0272011 | A1 | 11/2007 | Chapa, Jr. et al. |
| 2008/0018479 | A1 | 1/2008 | Hashimoto et al. |
| 2008/0021676 | A1 | 1/2008 | Vock et al. |
| 2008/0111695 | A1 | 5/2008 | Yamagajo et al. |
| 2008/0143620 | A1 | 6/2008 | Khatri |
| 2008/0246615 | A1 | 10/2008 | Duron et al. |
| 2008/0246616 | A1 | 10/2008 | Sakama et al. |
| 2008/0284654 | A1 | 11/2008 | Burnside et al. |
| 2008/0316032 | A1 | 12/2008 | Kia |
| 2009/0015377 | A1 | 1/2009 | Fogg et al. |
| 2009/0141138 | A1 | 6/2009 | DeAngelis |
| 2009/0184806 | A1 | 7/2009 | Kia |
| 2009/0231198 | A1 | 9/2009 | Walsh et al. |
| 2009/0284368 | A1* | 11/2009 | Case, Jr. .................... 340/539.1 |
| 2010/0019897 | A1 | 1/2010 | Stewart et al. |
| 2010/0051701 | A1 | 3/2010 | Ogata et al. |
| 2010/0088023 | A1 | 4/2010 | Werner |
| 2010/0295943 | A1 | 11/2010 | Cha et al. |
| 2010/0302910 | A1 | 12/2010 | Howell |
| 2011/0054792 | A1* | 3/2011 | McClellan ................... 701/300 |
| 2011/0141221 | A1 | 6/2011 | Satterlee et al. |
| 2011/0298583 | A1* | 12/2011 | Libby et al. .................. 340/5.28 |
| 2012/0115557 | A1 | 5/2012 | Kia |
| 2012/0230240 | A1 | 9/2012 | Nebat et al. |
| 2014/0052279 | A1* | 2/2014 | Van Rens ........................ 700/91 |

FOREIGN PATENT DOCUMENTS

| | | |
|---|---|---|
| JP | 4394600 A | 10/2009 |
| JP | 2010-088886 A | 4/2010 |
| KR | 10-2006-0078335 A | 7/2006 |
| KR | 10-2007-0092982 A | 9/2007 |
| KR | 10-2008-0090269 A | 10/2008 |
| KR | 10-2010-0100500 A | 9/2010 |

OTHER PUBLICATIONS

PCT Search Report, PCT US 2011-026717, Mar. 1, 2011.
Electronic Product Code (EPC) Tag Data Standards Version 1.1 Rev. 1.24; EPC Global, Inc. Apr. 1, 2004.
Integration of RFID and Cellular Technologies, UCLA, WINMEC 2004; Karali, Sep. 2004.
Alien Debuts Gen 2 Interrogator, RFID Journal; O'Connor, Aug. 4, 2005.
Antenna Design for UHF RFID Tags: A Review and a Practical Application, IEEE Transactions on Antennas and Propagation, vol. 53, No. 12; Rao and Nikitin, Dec. 2005.
Electronic Product Code (EPC) Radio-Frequency Indentity Protocols Class-1 Generation-2 UHD FRID Protocol for Communications at 860 MHz-960 Mhz, Version 1.0.9; EPC Global, Inc., Jan. 2005.
Electronic Product Code (EPC) Generation 1 Tag Data Standards Version 1.1 Rev.1.27; EPC Global, Inc., May 10, 2005.
UHF Gen 2 System Overview, TI-RFID; Texas Instruments, Mar. 2005.
Trolleyponder/Ecotag RFID Newsletter, No. 51; Trolley Scan Pty Ltd, Jan. 5, 2006.
Tests on Timing Module for Sports Timing; Trolley Scan Pty, Jun. 2004.
New for 2005—Best Racing now uses DAG chip timing; DAG 2005.
Intermec RFID System Manual; Intermec 2005.
RFID Primer; Alien Technology, 2004.
DAG System Instructions, Version 4; Pygma Lyon (DAG), Jul. 9, 2004.
DAG System Instructions—DAG Triathlon, Version 5; Pygma Lyon (DAG) Jul. 23, 2004.
DAG System—Badgeur V2 Sport Version Datasheet; Pygma Lyon (DAG), Jul. 19, 2004.
Annex 1: Utilization of the Dag Badger System; Pygma Lyon (DAG).
Alien RFID Academy Training Manual; Alien Technology, Sep. 22, 2004.
Alien Advanced RFID Academy; Alien Technology, Mar. 16, 2005.
Reader Interface Guide, V2.1.0; Alien Technology, 2004.
Mobile RFID Reader with Database Wireless Synchronization, S. Sandoval-Reyes, et al, 2nd ICEEE and CIE2005, Mexico City, Sep. 7-9, 2005.
Tag Programming Guide, Nanoscanner Reader v01.02.01, Alien Technology, 2003.
Mitigating the Reader Collision Problem in RFID Networks with Mobile Readers, Shailesh M. Birair and Sridhar Iyer, Indian Institute of Technology, Mumbai, India, 400 076, IEEE, 2005.
PCT Search Report, PCT US 2011-020901, Jan. 11, 2011.
PCT Search Report, PCT US 2011-020905, Jan. 11, 2011.
PCT Search Report, PCT US 2011-046032, Jul. 20, 2011.
PCT Search Report, PCT US 2011-050570, Sep. 6, 2011.
European Search Report, EP 11813296, Feb. 5, 2015.

* cited by examiner

MESSAGE TYPE | SOURCE | CUSTOM 1 | CUSTOM 2 | CUSTOM N | EOM |

DEFINITIONS FOR EACH FIELD IN THE INFORMATION PACKET STRUCTURE

MESSAGE TYPE  – INDICATOR FOR THE TYPE OF MESSAGE BEING SENT
SOURCE        – THE NAME OR ID OF THE TRANSMITTING SYSTEM
CUSTOM 1...N  – VARIABLE LENGTH FIELD CONTAINING USER-DEFINED DATA
EOM           – INDICATOR PLACED AT THE END OF THE INFORMATION PACKET
|             – SEPARATOR USED BETWEEN EACH FIELD OF INFORMATION WITHIN
                THE PACKET, AS WELL AS AT THE END OF AN
                INFORMATION PACKET

FIG. 8

(A) –READ|FROM|TAGSERIALNUMBER||TIME|PACKET#|EOM|
(B) –READ|FROM|PARTICIPANTNAME|TIME|PACKET#|EOM|
(C) –RESEND|FROM|DESTINATION|PACKET#|EOM|
(D) –TSYNC|FROM|TIME|EOM|
(E) –LOOKUP|FROM|IDENTIFIER|PACKET#|EOM|
(F) –COMMAND|FROM|DEST|IDENTIFIER|PACKET#|EOM|
(G) –RSIG|FROM|TIME|EOM|
(H) –RQIMAGE|FROM|DEST|IDENTIFIER|COMPRESSION|PACKETSIZE|PSOCKET|PACKET#|EOM|
(I) –STIMAGE|FROM|DEST|IDENTIFIER|COMPRESSION|PACKETSIZE|PSOCKET|PACKET#|EOM|

FIG. 9

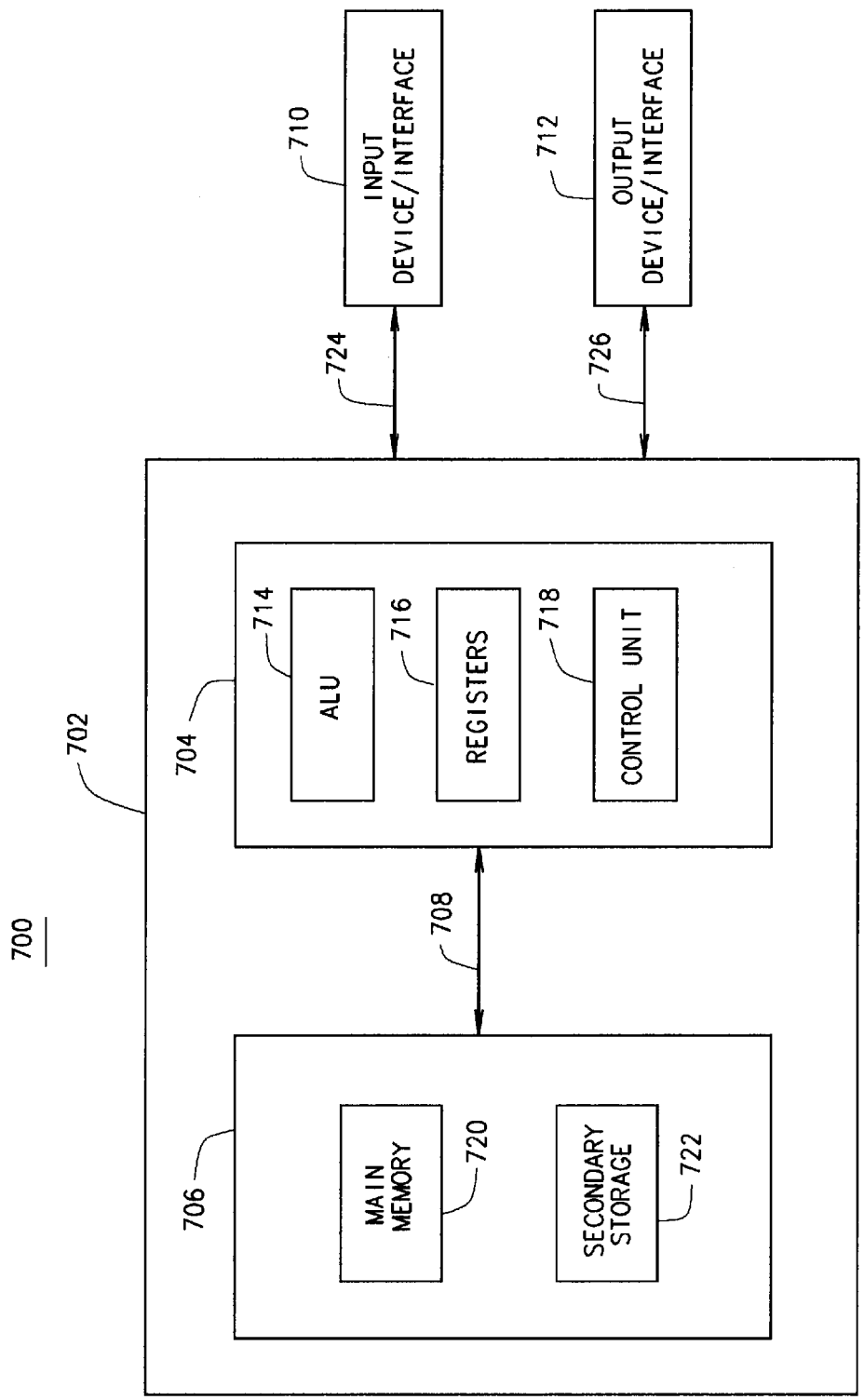

AUTOMATED TIMING SYSTEMS AND METHODS HAVING MULTIPLE TIME EVENT RECORDERS AND AN INTEGRATED USER TIME ENTRY INTERFACE

CROSS-REFERENCE TO RELATED APPLICATIONS

This application claims the benefit of U.S. Provisional Application No. 61/369,013, filed on Jul. 29, 2010. The disclosure of the above application is incorporated herein by reference.

FIELD

The present disclosure relates to timing systems and, more specifically, to integrated timing system (ITS) for tracking the passing of monitored persons or objects past a monitored point.

BACKGROUND

The statements in this section merely provide background information related to the present disclosure and may not constitute prior art.

RFID tag reader systems (TRS) that are used to track RFID tags often must be able to detect numerous tags crossing a detection point within a very short period of time. For example, RFID tag reader systems are often used in sporting events to time participants of such events. In such applications, that include marathon races, the RFID tag readers for the sports timing systems have a very difficult job as they are required to read hundreds, or perhaps thousands of timing chips as they cross a start, split, or finish line. The technology typically used by other systems can very susceptible to electrical interference, weather, and other factors. The RFID race timing systems operates at an ultra-high frequency and is less susceptible to interference. This helps reduce the number of problems the user might experience on race day. Many such systems use a passive chip that does not require a battery. The chip operates in the Ultra-High Frequency (UHF) range, which provides a more consistent and clean signal. Some of these systems often use low frequency (LF) chips that can be susceptible to interference from things like electrical power lines, rebar in concrete roads, mobile telephone systems or storms. UHF signals travel in a direction commonly referred to as line-of-sight. This simply means that the signal is highly concentrated in a single direction, and that is why it works so well for timing races.

While current RFID readers can have an overall chip read success can range from 98.0% to 100% with as many as 30 participants crossing a finish line within a 1-second period, some tags cannot be read and their passing of the detection point information is never automatically recorded by the RFID readers. As such, there is a need for providing methods and systems for enabling supplemental tag reads.

When using an RFID system for timing sporting events, one of the problems often experienced is the failure of the timing system to read 100% of the RFID tags worn by the participants. There are numerous reasons why an RFID tag may not be read, but it is well understood in the sports timing industry that this problem will occur at many events. When an RFID tag is not read, critical information is lost for that participant, which could potentially affect the outcome of the event. Thus, there exists a need to ensure that timing information is collected for as many participants as possible. The METS system and improvement to the ITS system solves this problem by providing a network enabled manual backup entry system that complements an RFID timing system.

SUMMARY

The inventor hereof has succeeded at designing a ITS Manual Entry Timing System (METS) that is a computer software-based system and method that provides the ability to capture times for race participants through manual data entry, and to provide those participant times to an RFID system for the purposes of generating backup data in case an RFID timing system at a monitored location was unsuccessful at reading an RFID tag on the event participant.

In one aspect, a system for timing of a passing of an object past a monitored location where the monitored location is being monitored by timing system having at least one automated object detection system for wirelessly detecting the passing of the object at the monitored location. The system comprises a remote entry computer system having a processor for executing computer executable instructions, a clock for determining a present time, a user interface for receiving user input data, a memory being a computer readable medium storing the computer executable instructions and the received user input data, and a communications interface for communicating with the timing system. The system includes a computer readable medium including the computer executable instructions for performing the method of receiving the user input data at the user interface, receiving from the clock a user data input time associated with the receipt of the received user input data at the user interface, and storing the received user input data and the user data input time in the memory. The computer executable instructions also include the method of creating a received user data message including the stored user input data and a time value as a datagram message and transmitting the user data message over the communications interface to the timing system.

In another aspect, a system for timing of a passing of an object past a monitored location. The system comprises a computer implemented timing system, an object detection system, and a remote entry computer system. The computer implemented timing system has a data interface for communicating over a data communication network, a memory with executable instructions for operating the data interface to communicate and for storing an identification of the timing system, event data, and object data, the object data including an object identifier for uniquely identifying each object and object timing data, and a processor coupled to the memory and the data interface for executing the executable instructions for operating the data interface to communicate datagram messages over a stateless packet data communication network. The object detection system is communicatively coupled to the timing system and positioned at the monitored location. The object detection system has a processor, memory and communication interface and at least one antenna for wirelessly detecting a passing of the object by the monitored location. The remote entry computer system has a processor for executing computer executable instructions, a clock for determining a present time, a user interface for receiving user input data, a memory being a computer readable medium storing the computer executable instructions and the received user input data, and a communications interface for communicating with the timing system. The remote entry system includes a computer readable medium including the computer executable instructions for performing the method of receiving the user input data at the user interface, receiving from the clock a user data input time associated with the receipt of the received user input data at the user interface, and storing the received user input data and the user data input time in the memory. The computer executable instructions also include the method of creating a received user data message including the stored user input data and a time value as a datagram message and transmitting the user data message over the communications interface to the timing system.

The various aspects of the present disclosure will be in part apparent and in part pointed out below. It should be understood that various aspects of the disclosure may be implemented individually or in combination with one another. It should also be understood that the detailed description and drawings, while indicating certain exemplary embodiments, are intended for purposes of illustration only and should not be construed as limiting the scope of the disclosure.

BRIEF DESCRIPTION OF THE DRAWINGS

FIG. 8 is an illustration of the format for the variable length METS packet messages according to one exemplary embodiment.

FIG. 9 is an illustration of the formats for an exemplary set of METS messages according to one exemplary embodiment.

FIG. 10 is a block diagram of a specialized METS remote entry computer system that is also suitable for implementing the object detection systems and timing systems in various embodiments as described herein.

It should be understood that throughout the drawings, corresponding reference numerals indicate like or corresponding parts and features.

DETAILED DESCRIPTION

Figure 1:
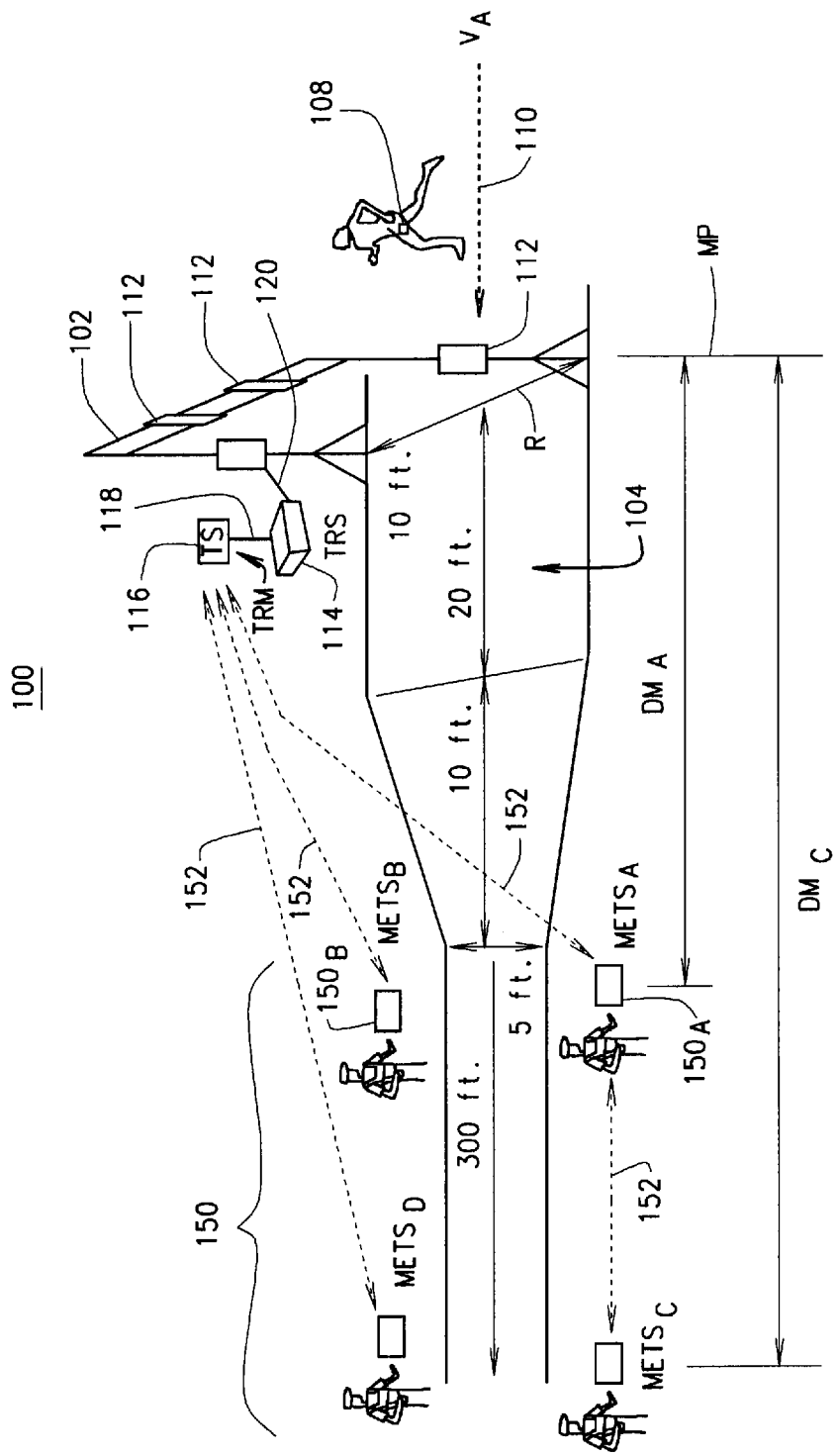
FIG. 1 is an illustration of a timing system at a monitored location with a single automated tag reader system and four remote entry METS systems each spaced apart from the monitored location according to a one exemplary embodiment.

The following description is merely exemplary in nature and is not intended to limit the present disclosure or the disclosure's applications or uses.

Before turning to the figures and the various exemplary embodiments illustrated therein, a detailed overview of various embodiments and aspects is provided for purposes of breadth of scope, context, clarity, and completeness.

The Integrated Timing System (ITS) Manual Entry Timing System (METS) and method associated therewith is a software implement method and system that runs on computing devices and uses the communication of messages to send race participant information over a network to one or more METS configured, enabled or compatible ITS system component. The METS system includes a METS remote with METS remote user interface. The METS configured ITS system components can include, but is not limited to the ITS system user or control console, one or more ITS RFID tag reader systems (TRS), and ITS announcer system, by ways of example. Users of the ITS with METS system and enter RFID tag reads that may have been or were missed by the automated RFID TRS systems. In some embodiments, the METS remote entered METS tag reads can be in addition to or supplemental to the RFID TRS tag reads such as to verify and provide a manually entered read for analysis and ITS system adjustment. The ITS systems as described herein have been generally described for timing of race events. Such an exemplary embodiment is only for the sake of example. In such example ITS systems, the race participant names or assigned race numbers are utilized by the ITS system for logging, tracking and reporting of participant activity in the race. The TRS tag readers read the RFID tags associated with the participant or object associated therewith such as a bike, helmet, bib, car, motorcycle or similar object when the tags are within RFID tag read range of the TRS system. The TRS system transmits the tag read information to an ITS system using a series of formatted messages. An intelligent buffer in the ITS system is provided to manage the flow of messages between the ITS system components over an ITS network or networks. There can be a single network, but with different types of communication facilities forming the ITS network. Various or different ITS system components that implement the METS system can utilize the same or different communication facilities within the ITS METS network. These can include, but are not limited to, wired, wireless, satellite, cellular, serial, or private networks. As will also be discussed, in one embodiment, the METS system remotes utilize a wireless communications interface with the METS configured ITS components as many or most of the other ITS system components are at least temporarily fixed known position. However, the METS remote is often a highly portable user interface or application that can be implemented in software on a laptop computer, portable tablet, a tablet PC, smart phone or customized hand held unit. As such, the user of the METS remote can move and is highly portable and a wireless interface between the METS remote and any other METS configured ITS system can provide a preferred communication link. Additionally, any of the METS configured ITS system components can act as a gateway with the METS remote component or components. In such applications, the METS remote may communicate wirelessly through a first METS ITS component, but such messages are relayed on other METS configured ITS system using a wired communication facility.

Generally, as described herein, the METS system and METS configurations in the ITS system components are software-based applications and communication interfaces. The communication interfaces are used by the overall architecture of many embodiments of METS to include TCP/IP and UDP messages to communicate the manually entered race participant information at the METS remote to METS compatible ITS system components. The ITS system equipped with METS provides a backup capability to any METS compatible or equipped ITS system, such as a sports timing systems wherein the automated RFID readers fail to read one or more RFID tags at a particular detection location. The METS system can be loaded on multiple computing devices and used at the same monitored location, or at numerous monitored locations anywhere on a racecourse or other traveled path. The METS system transmits formatted messages to a receiving system, which can be an ITS system with one or more RFID TRS systems. For example, typically each TRS system monitors a single monitored point such as a finish line or intermediate point, and each has one or more RFID antenna associated therewith. In addition, the METS system can record received manual entries to a permanent data store in the METS remote in case a network connection fails, or in case no ITS communications network is available. This allows the METS system to be used at monitored locations on a course or path of movement where a communication network is not available. Also, as one skilled in the art would understand after reading this disclosure, a user of the METS and METS ITS systems can manually time an event by simply typing in all of the bib numbers and time the race, with synchronized times, and adjusted times, without ever using a TRS RFID reader.

In one embodiment, a system for timing of a passing of an object past a monitored location where the monitored location is being monitored by timing system having at least one automated object detection system for wirelessly detecting the passing of the object at the monitored location. The system comprises a remote entry computer system having a processor for executing computer executable instructions, a clock for determining a present time, a user interface for receiving user input data, a memory being a computer readable medium storing the computer executable instructions and the received user input data, and a communications interface for communicating with the timing system. The remote entry computer system can be any suitable computer system such as, for example, a laptop computer, a smart phone and a tablet PC.

The METS remote system includes a computer readable medium including the computer executable instructions for performing the method of receiving the user input data at the user interface, receiving from the clock a user data input time associated with the receipt of the received user input data at the user interface, and storing the received user input data and the user data input time in the memory. The computer executable instructions also include the method of creating a received user data message including the stored user input data and a time value as a datagram message and transmitting the user data message over the communications interface to the timing system.

In some embodiments, wherein the computer executable instructions further include performing the method of storing in the memory an offset time value, and determining an adjusted time from the user data input time and the stored offset time value, wherein the creating of the received user data message includes the adjusted time as the time value.

The offset value can be provided in a number of different manners. In one embodiment, the user interface is configured for receiving the offset time value that is subsequently stored in the memory. For example, the user of the METS remote may be instructed or have knowledge of the expected offset time and enter that time using the METS remote user interface. The METS remote may also have the ability to determine the correct suitable offset based on its known position relative to the monitored location. For example, the METS system may receive the GPS coordinates for the monitored location. The METS system may also receive its own GPS coordinates either from a remote system such as a TRS or ITS, or may have its own GPS receiver. Once it knows its GPS location, it can determine its current location and the computer executable instructions can determine the offset time value based on the determined current location and in some cases the known or provided or stored GPS location of the monitored location. In other embodiments, the offset time can be provided to the METS remote via the METS communication interface That is subsequently stored in the memory.

As addressed herein, the METS remote can be configured for receiving a clock synchronization message including a system time value from the timing system. In such embodiments, the clock of the METS remote can be configured to set the present time of the clock to the value of the received system time value. This can be value that a user entry is initially stamped or associated with and to which the offset is later applied. As will be described at least one of the ITS and or TRS or other object detection system can be configured to generate a clock synchronization message that includes a standard clock time for all ITS and METS system components.

The METS remote can also be configured to receive a verification message, wherein the computer executable instructions include the method of creating an verification response message in response to receiving the verification message; and transmitting the verification response message over the communication interface after the creating thereof. The ITS and/or TRS or other object detection system or any METS coupled and compliant system can also receive and/or generate a verification message and receive responses therefrom.

Figure 3:
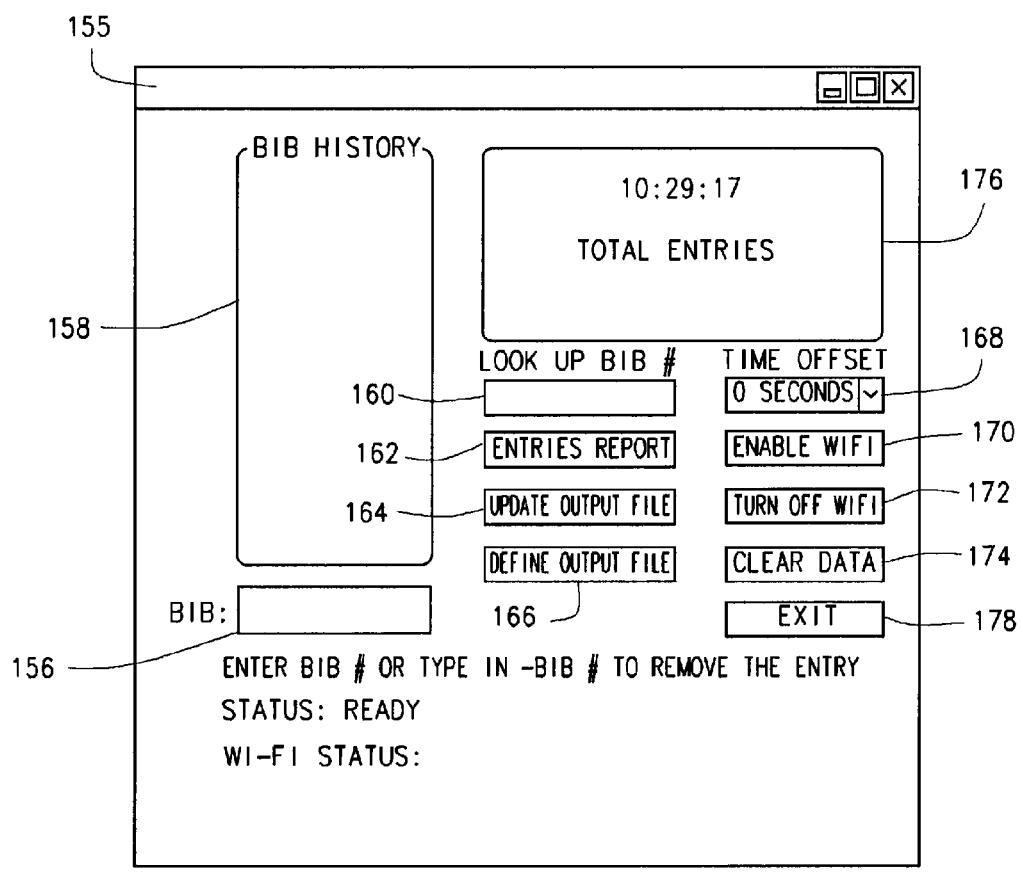
FIG. 3 is a user interface for a remote entry computer system (METS) for receiving manual data entries from a user according to one exemplary embodiment.

As will be addressed below with regard to FIG. 3, the METS remote user interface can include a key pad and a display. The user interface can be configured or customized as shown in FIG. 3 to receive user input data that can be input rapidly during an event. This user input data can be any data, but can include an identification number such as a bib or object or participant number, or a name or other identification of the object for which the time entry is being manually entered and recorded by the METS remote system.

In some embodiments, the METS remote user input data can include an identification number associated with the object. The user of the METS remote may wish to retrieve information from the ITS system associated with such identification number including, but not limited to the name, description or a picture of the object or participant. As one example, where the METS remote user interface includes a display, the user of the METS remote can input the bib number of the participant and the METS remote computer executable instructions can format and transmit an image request message including the identification number over the communication interface requesting an image file associated with the identification number from the timing system or another remote system. In such cases, the ITS or TRS would receive the image request message, search its database records for an image as requested and prepare and transmit an image message containing the requested image file to the METS remote. The METS remote would then receive an image message including the requested image file over the communication interface and would display the image contained in the received image file. This can be used to verify the identity of the particular participant and with the bib number.

As described also herein, as a mobile unit that may be wirelessly connected using datagrams. As such, the METS remote can be configured to limit the protocol or communication facility overhead by sending duplicate copies of the same message rather than using an acknowledgement protocol. In such embodiments, a second or third copy of the same message can be transmitted after a predetermined or random time following the prior transmission. The receiving ITS or TRS system can receive each and keep, discard or ignore any received duplicated messages. As described herein, the METS remote can be highly mobile. As such, the communication interface can be wired or wireless for wirelessly communicating with the timing system and or TRS tag reader system. These can include a Wi-Fi interface, or any other radio, satellite, or light wave wireless interface.

As this can be a wireless network, such networks can fail or the position of the METS remote may be such as to inhibit the wireless communication between the METS remote and the intended recipient ITS or TRS system. In such situations, the METS remote can be configured to detect a current inability of communicating with the timing system over the communication interface. The system can suppress the transmitting of the user data message in response to the detecting of the current inability to communicate and monitor the status of the communication interface to determine a renewed ability to communicate with the timing system over the communication interface. When the MET remote identifies the renewed ability to communicate with the timing system, the METS remote can begin to retransmit the stored but suppressed transmission of messages.

In another embodiment, a system for timing of a passing of an object past a monitored location. The system comprises a computer implemented timing system, an object detection system, and a remote entry computer system. The computer implemented timing system has a data interface for communicating over a data communication network, a memory with executable instructions for operating the data interface to communicate and for storing an identification of the timing system, event data, and object data, the object data including an object identifier for uniquely identifying each object and object timing data, and a processor coupled to the memory and the data interface for executing the executable instructions for operating the data interface to communicate datagram messages over a stateless packet data communication network. The object detection system is communicatively coupled to the timing system and positioned at the monitored location. The object detection system has a processor, memory and communication interface and at least one antenna for wirelessly detecting a passing of the object by the monitored location. The remote entry computer system has a processor for executing computer executable instructions, a clock for determining a present time, a user interface for receiving user input data, a memory being a computer readable medium storing the computer executable instructions and the received user input data, and a communications interface for communicating with the timing system. The remote entry system includes a computer readable medium including the computer executable instructions for performing the method of receiving the user input data at the user interface, receiving from the clock a user data input time associated with the receipt of the received user input data at the user interface, and storing the received user input data and the user data input time in the memory. The computer executable instructions also include the method of creating a received user data message including the stored user input data and a time value as a datagram message and transmitting the user data message over the communications interface to the timing system.

As addressed above, the METS remote reads can have their times adjusted by an offset to account for the position of the METS remote being apart from the monitored location. In such situations, the timing system or TRS or other object detection system can determine the appropriate offset time value, and create and send the message that includes the determined offset time value to the METS remote system.

The determination of the offset time value can include a variety of different factors that can include, but not limited to, one or more of a distance between the remote entry computer system and the monitored location, a determined speed of one or more objects passing the monitored location, and a determined change in speed of one or more objects passing the monitored location.

METS Exemplary File Structure

Primary METS File Structure

An ITS system can have multiple files that are used within the system, but the two files the user will need to access are the Chip Output File and Database File. The file formats documented below are subject to change, so please check with us periodically for updates.

METS Chip Output File

As the ITS software is running at a race and collecting chip times, it will immediately write the chip read information to a text file. The user will decide the name and location for the file. This file is updated in real-time by the ITS software as the race progresses and it contains the following information: Antenna#,Bib#,Bib#,"Time" The file uses a comma-delimited format and the time field has quote marks.

This format is readable by a spreadsheet or many third party programs. The user can simply ignore the Antenna # field. It is used internally by the ITS system. The Bib # field appears twice and this is not an accident. The ITS system repeats this number because several third-party programs require this format when importing our file. The final entry is the time of the chip read which is in the format of "HH:MM:SS"

In the ITS system, the chip number is the same as the bib number worn by the participant. Thus, for a race with perhaps 500 participants, the Bib # field may contain a value from 1 to 500. The largest value allowed within ITS for a Bib # field is 99999. Future versions of the software will permit bib numbers up to 500000.

The following is a sample of a typical ITS output file:
0,41,41,"14:27:42"
0,47,47,"14:27:44"
0,39,39,"14:27:46"
0,14,14,"14:27:48"
0,32,32,"14:27:50"

The ITS system is capable of reading a chip multiple times as it approaches a monitored point. Thus, an output file may contain multiple entries for the same chip. The last entry is the final read on a chip. For example, the following output file shows that a single chip was read multiple times as the runner approached the finish line in a race.
0,32,32,"14:28:20"
0,32,32,"14:28:21"
0,32,32,"14:28:22"

As ITS reads timing chips, it appends new data to the file and continues to do so during the race. Thus, the user should never attempt to modify or lock the file while a race is ongoing. It is often desirable to read the file once the race has concluded, or while the system is not actively reading timing chips.

METS Remote Output File

Typically, the METS Remote output file will only contain one entry since most runners can pass through the monitored point in one second or less. However, if a race has a number of walkers, the user could easily see 4 to 5 entries for the same timing chip as the walker approaches and goes past the finish line.

As the ITS software is running at a race and collecting chip times, it will write these times to a text output file. The user can decide the name and location for the file using this default option. If the user chooses not to define it here, the software will ask the user to define it before it starts collecting chip times. By defining the standard output file here, the user can save some time on race day. This file is updated in real-time by the ITS software as the race progresses and it contains the following information: Antenna#,Bib#,Bib#,Time. This format is readable by a spreadsheet or many third party programs such as Race Director.

It should be noted that in multi-unit or component ITS systems, the record may not be for an Antenna#, but would be an ID or name for any of the originating systems, including, a secondary ITS system, a METS, or similarly connected or interoperable system.

METS Message Transmission of Duplicated Messages

The ITS system or any ITS component thereof can be configured as an option for acknowledgement for use in with METS. However, use of an acknowledgment in a communication protocol creates considerable overhead on the network especially where retransmission of un-received messages has occurred. Instead of needing an acknowledgement, in some embodiments the METS systems, as will be described, the METS system can be configured to send more than one communication message (also referred herein as a packet, but it should be understood that such message may be other than a packet) to ensure that at least one of the dual messages arrives at the METS destination system. Of course one skilled in the art will understand that more than two messages could also be sent in some embodiments, or the same messages sent multiple times in a broadcast or multicast mode. The ITS system component that is METS enable can receive one or more of the same messages from the METS remote system and store each or store a first and, recognizing the duplication of a subsequently received message, discard or ignore the subsequently received duplicate messages.

METS System Remote Synchronization

When a system receives the TSYNC time, such as by a METS (whether manually sent or automatically periodically sent as in the new embodiment), the METS software can also adjusted the TSYNC message based on an expected transmission delay. The manually entered event is time stamped with the synchronized time that is the same as that of the ITS. If so, no adjustment may be required. As such, with the use of the TSYNC being sent by the ITS to the METS for providing a synchronization of the internal clock of the METS with that of the ITS, the adjustment is not only for time standards, but can also deal with a situation where the time recorded for the participant is actually behind the time they truly finished a race, or passed a monitored point. For example, if a runner is captured on a backup timing system that is 100 feet behind the primary system, their clock time is correct because the TSYNC messages have done their job. However, the time at this backup point may be 3 to 4 seconds later than the primary system read time. If a backup METS system is used such as to make sure a time at the primary point is missed or improperly read at the primary, the METS backup time is used and now subtract an adjustment time and bring the chip read back to what it might have been if the ITS system had read the chip at the primary location. It essentially gives us a second chance to read the chip and adjust the time so the runner appears to have been recorded at the primary point.

METS System Remote Offset

The METS remote has an internal clock and received the time synchronized to the ITS system clocks as described above. However the METS remote can also be provided with an internal time offset. This METS remote office value is only used if the user is using a METS remote that is spaced apart from the primary TRS monitored point, such as the finish line.

Recall that there can be a secondary TRS monitored point that can be 25 to 30 feet behind the primary monitored point (finish line) that can also provide the user with an improved chance of reading all chips. With two TRS systems operating at a finish line, the combined read rates are typically better. However there is no guarantee of 100 percent read rate due to many conditions outside of the control, but nonetheless, redundant systems generally provide improved ITS system read results. When the user has decided to place a METS remote system at the finish line, the user will want the time recorded for the finisher to be as accurate as possible. Thus, the METS remote offset allows the METS user, the ITS user, or the ITS system itself to define a METS Offset amount of time that will be subtracted from the METS recorded time for determining the time sent by or from the METS remote. For example, the user can set the METS remote offset value from 0 to −5 seconds, if the METS remote user is timing a 10K race and is positioned 25 feet behind the finish line.

In other embodiments, the METS remote system can be configured to receive remotely provided values for the offset to be used by the METS remote. As described in the messages below, a TROFFSET message can be provided by a TRS system or by the ITS system to the METS remote for providing a revised or replacement offset time value to the time stamp of the manual entry. When the METS remote or the ITS system receives the TROFFSET message and the offset time value contained therein, the value of the READ message can be adjusted by the new offset time value to more accurately reflect the time of passing of the chip at the monitored point, even though the METS reader is positioned apart from the monitored point. As will be discussed below, the amount of the TROFFSET can be calculated dynamically based on the performance, speed and acceleration or deceleration of the participants after passing the monitored point.

As noted, the METS remote may perform the offset function. When this occurs, the READ message can be amended by an indicator or additional message therein to indicate the time as indicated by the READ message reflects the offset value and not the value of the TSYNC. Also, the READ message can reflect that the message is the TSYNC value if the ITS METS system is set up to have an ITS component other than the METS remote perform the offset time before being recorded in the ITS database. Such time offset message indicators can be a single character or bit added to the READ message as described below. This can also be handled by use of the antenna# field entry or the like.

METS Remote Other Embodiments

The METS remote is also capable of implementing other features and functionality of some of the other ITS system components to increase its value to the user and to improve the functionality of its use at events. Several of these will now be briefly discussed.

The ITS system and METS system can be configured in some embodiments, so that the ITS system or component requests the METS system to resend a previously sent message using the RESEND message. While described above, the UDP datagram messages may not be acknowledged or guaranteed, the ITS system component may have a need for a particular READ message sent by the METS remote to be resent. For instance, the ITS system component may want to verify or update the message such as to compare the message to a TRS received message for determination of the METS reader offset time as one example.

The ITS system and METS system can also utilize a verification message or process by use of a remote signal message (RSIG). This can be particularly useful with the METS remotes as they are mobile and may or may not have continuous communications with the other ITS system components. This message can be used as a separate keep alive or verification of the operation of the METS remotes within the overall design METS configured ITS system.

The METS remote and ITS system can also utilize a lookup up capability by sending a LOOKUP message. The METS remote may not be configured with the entire ITS database and listing of tags. As such, the user of the METS remote may want to request the name or tag number of a participant that the METS user witnessed at a particular location. Similarly, the user of the METs remote may want to enter a tag number or name and request that the ITS system provide a picture or image or video of the participant by using the request image command RQIMAGE. This may be useful for enabling the METS user to verify the participant or to identify the participant at the particular location of the METS remote user. This would inherently include use of the STIMAGE message would provide the image from the ITS system back to the METS remote system.

Of course, those skilled in the art would also understand that the METS systems may also wish to transmit other commands between METS compatible systems. As such, the COMMAND message can be used for administrative and other purposes in support of the herein described functionalities.

Referring now figures, FIG. 1 illustrates a timing system (ITS) 100 includes as single tag reader system (TRS) 102 positioned on a racetrack 104 in which a participant 106 having an RFID tag 108 is traveling along route 110 with a velocity $V_A$. As shown the TRS 102 has a plurality of antennas 112 positioned about a particular location on the track 104 that is the monitored location MP and by which the participant 106 travels when traveling along route 110. TRS 102 each include a computer system (also generally referred to as TRS 114) that is communicatively coupled to the antennas 112 via a communication link 120. In this exemplary embodiment the monitored point MP is also positioned at the reference line R, which can be equated to a starting line, a checkpoint, or a finish line on racetrack 104. The TRS 114 is communicatively coupled to integrated timing system (ITS) 116 via communication network 118. TRS 114 transmits one or more tag read messages TRM to the timing system TS 116. A plurality of METS remotes systems 150 are positioned at a spaced apart location from the monitored point MP. As such, METS 150A and 150B are positioned at a distance of $DM_A$ from the monitored point MP, and METS 150C and 150D is positioned at a distance of $DM_B$ from the monitored point MP. Each METS 150 (150A, 150B, 150C, and 150D) is wireless coupled or communicative with the timing system 116 via wireless link 152, either directly as with METS 150A, 150B, and 150C, or indirectly where METS 150C first wirelessly communicates with METS 150A, and then METS 150A relays such METS 150B messages between METS 150B and ITS 116. While not shown, one or more of the METS 150 can also wirelessly communicate with the TRS 114 if the TRS 114 is equipped or configured for METS compatibility.

Figure 2:
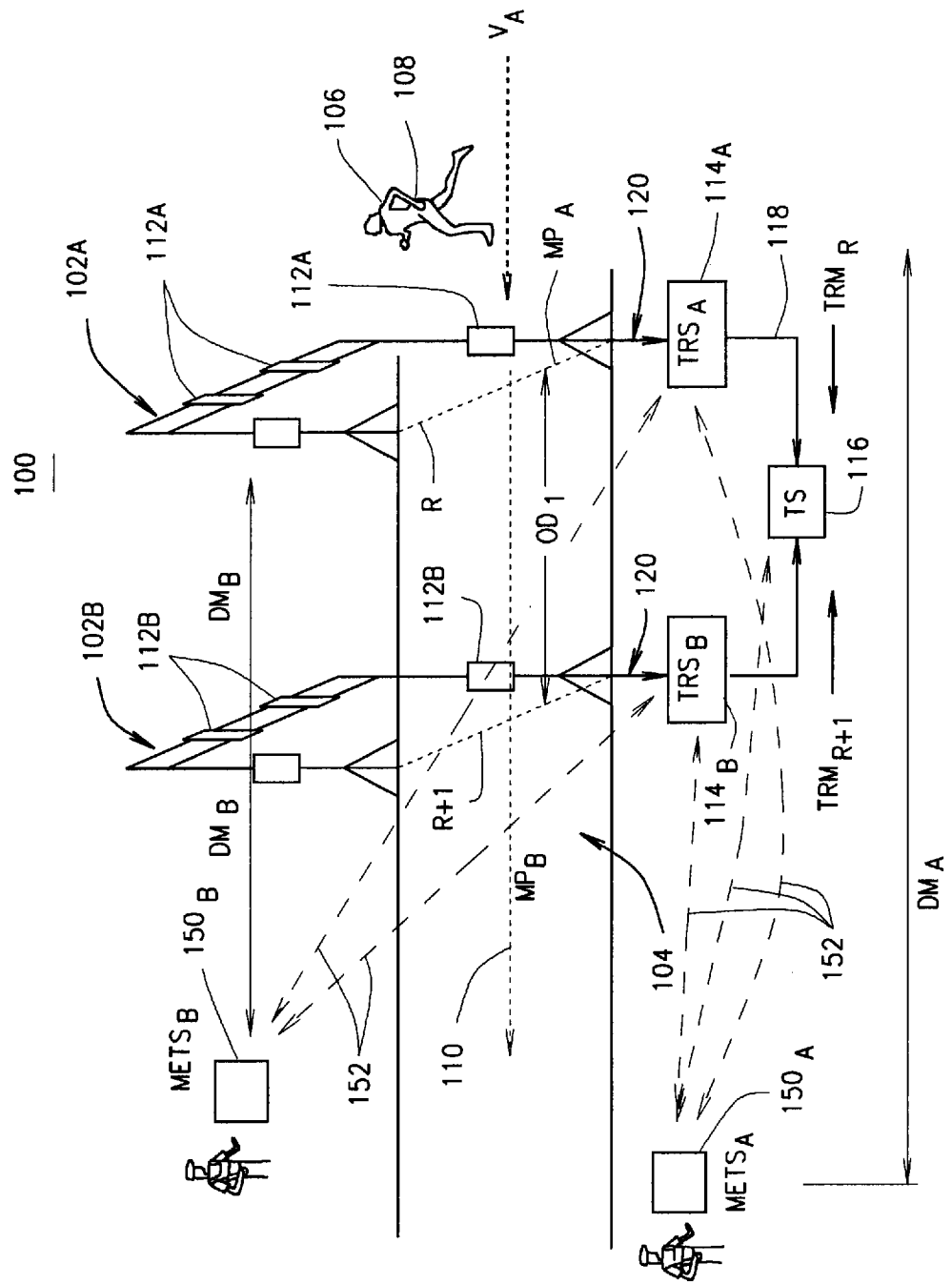
FIG. 2 is an illustration of a timing system at a monitored location with a two automated tag reader systems and two remote entry systems each spaced apart from the monitored location according to a one exemplary embodiment.

The system 100 of FIG. 2 is similar to that of system 100 of FIG. 1 except in this exemplary embodiment, the system 100 has two tag reader systems 102A and 102B spaced apart from one another and positioned on a racetrack or course 104 in which a participant 106 having an RFID tag 108 is traveling along route 110 with a velocity $V_A$. As shown each tag reader system 102A, 102B has a plurality of antennas 112A, 112B, respectively positioned about a particular location on the track 104 and about participant travel route 110. TRS 102A and 102B each include a computer system (also generally referred to as $TRS_A$ 114B and $TRS_B$ 114B which will be referred generally hereafter) each of which is communicatively coupled to its respective antenna 112A, 112B via a communication link 120. The TRS 102A is positioned about monitored point $MP_A$ and TRS 102B is positioned about monitored point $MP_B$. In this exemplary embodiment $MP_A$ is also positioned at the reference line R, which can be equated to a starting line, a checkpoint, or a finish line on racetrack 104. The $MP_B$ of $TRS_B$ is positioned at an offset distance $OD_1$ from reference line R, and is also referred to as position R+1. Each $TRS_A$ 114A and $TRS_B$ 114B is communicatively coupled to timing system (TS) 116 via communication network 118. TRSA 114A transmits one or more tag read messages $TRM_A$ to the timing system TS 116 and $TRS_B$ 114B transmits one or more tag read messages $TRM_{R+1}$ to timing system TS 116. As shown in this embodiment, a first METS 150A is positioned at a distance $DM_A$ behind monitored point MP and a second METS 150B is positioned at a distance $DM_B$ behind monitored point MP. METS 150A wirelessly communicates with $TRS_A$ 114A, $TRS_B$ 114B and timing system TS 116. METS 150B wirelessly communicates with only $TRS_A$ 114A, $TRS_B$ 114B which may be due to the location of METS 150B not being within range of the TS 116. In such situations, either $TRS_A$ 114A or $TRS_B$ 114B can communicate directly with METS 150B, or one or both can relay the communications between METS 150B and TS 116 over communication network 118.

FIG. 3 is a user interface for a remote entry computer system (METS) for receiving manual data entries from a user according to one exemplary embodiment.

As shown in FIG. 3, the METS remote 150 can include a user interface 154. The user interface 154 can include a user screen 155 can include be a text box 156 on the left side of the screen with a label called "Bib:" that is where the user will enter the bib numbers of the race participants. As the user types in bib numbers, the bib numbers will display in the Bib History box 158 on the screen 155. If the user make a mistake and enter the wrong bib number in box 156, the user can simply type in a - sign with the bib number and it will be removed from the history in box 158. The user can have about 5 to 10 seconds to remove the entry; otherwise it may be committed to the history and transmitted to the ITS and thereafter recorded into the ITS database at the main ITS. The user interface screen 155 also includes a bib look up field 160 that enables the user to look up bib numbers from the memory. The Look Up Bib # field or box 160 allows the user to quickly look up a race participant by using their bib number. The messages sent from the METS remote system 150 can be a plain text message. The use of plain text messages permits the messages to be captured by third-party software. The user interface screen 155 also can include an Entries Report field 162. This allows the user to view all bib numbers entered into the METS system 150 via the user interface 154. The user can print the report, save it to a text file, or export it to a spreadsheet.

The user interface 154 can also include an Update Output File entry 164 or entry. This entry 164 enables the user to periodically flush the bib history from the METS remote 150 memory or store it on a local disk drive. As the user enters bib numbers in box 156, the entered bib numbers are kept in memory and not written to the disk drive until the user select option 164. If the user has not first defined the name of the Output file, the user will see a window appear asking the user to select an existing file name or create a new file name. The user interface 156 includes a Define Output File 166 field that allows the user to define the name of the Output file that will contain the manual entries the user is making with the METS software.

The user interface screen 155 can also include an input for receiving a user defined offset time by Time Offset field 168. This field 168 can include a drop-down menu allowing the user to define how many seconds the user wish to have added or subtracted from the time being written to the Output file, or the main ITS if the user are using a Wi-Fi connection. If the user are using the METS software at a distance of perhaps 20 feet behind the finish line, the user may wish to subtract 2 or 3 seconds from the time being recorded as the user create manual entries. This is important because the runner will have crossed over the finish line a couple of seconds prior to the user making the manual entry. Of course, if the user is using the METS software at the finish line, there is no need to adjust the time. If the user is using the METS software 50 feet in front of the finish line, the user may wish to add 2 or 3 seconds to the time recorded. Of course, the METS user could be as much as or more than 100 feet from the monitored location or finish line and the offset time should be adjusted manually or automatically as described below.

The user interface screen 155 can also include a field to allow the user to activate or initiate the wireless or wired communications interface with the METS enabled ITS system components such as the ITS 116 and/or the TRS 114. The Enable Wi-Fi field 170 can automatically initiate the sending of entries to such systems over the Wi-Fi network 152 or similar communication facility. After selecting the Enable Wi-Fi field 170, the user interface screen 155 can open a window in which the user can set the IP address for the ITS 116 or one or more TRS 114, as well as the Remote and Local Sockets for the communication. The user interface screen 155 includes a Turn off Wi-Fi field 172 to allow the user to discontinue the communications with other ITS system components.

The user interface screen 155 includes a field Clear Data 174 that enables the user to erase all of the entries in memory on the METS software. The user interface screen 155 can also include a display area 176 for displaying METS user information, such as shown as the total entries and the current system time. As discussed also herein, display 176 can also be used to display retrieved photos or images that are associated with particular entered bib numbers. Finally, the user interface screen 155 includes an Exit field 178 to exist the METS application.

Figure 4:
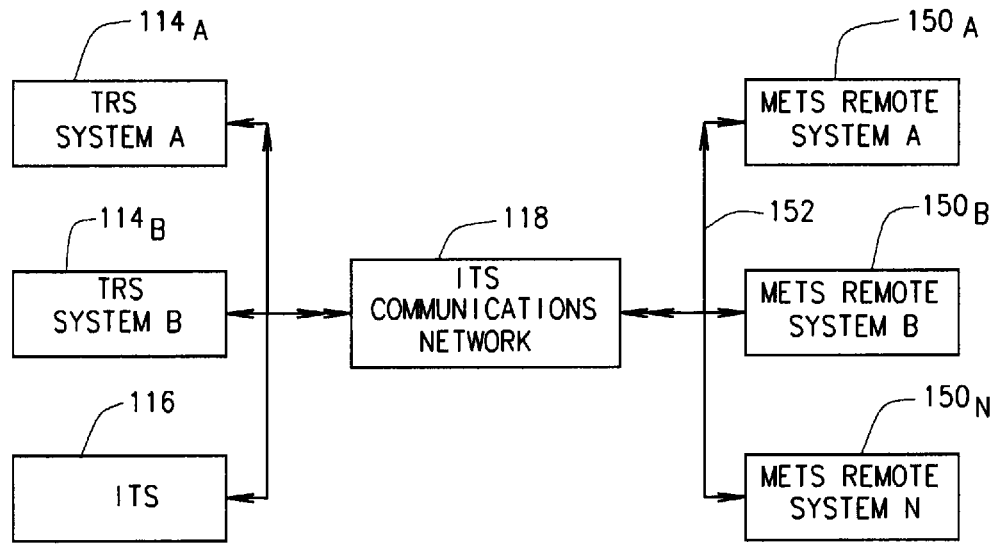
FIG. 4 is a high level architecture of an Integrated Timing System (ITS) having a plurality of automated tag reading systems and a plurality of METS remote entry systems according to one exemplary embodiment.

FIG. 4 is a high level architecture of an Integrated Timing System (ITS) having a plurality of automated tag reading systems 114 (shown as 114A and 114B), a timing system 116 and a plurality of METS 150 (shown as 150A, 150B, and 150N) that are the remote entry systems. The system communicate over the ITS communication network 118 and the METS system communicate with the other ITS METS systems over the METS communications link 152. As illustrated, multiple METS remote systems 150 can be used on a communications network 152 or 118 to send manually entered participant information to any one of several ITS RFID Systems TRS 114 or to the ITS user console 116. Each ITS TRS 114 can be configured to interface with METS 150 and can be addressed individually through a configuration option in the METS 150 that allows the METS user to define the IP address for the TRS 114, as well as the socket number for message reception. As will be addressed, the socket number provides a unique address on a computing device and permits multiple Backup systems to simultaneously communicate with the same TRS 114 system. FIG. 4 illustrates that each ITS component 116 or TRS system 114 can be paired with one or more METS remote systems 150. However, in some embodiments, the user can have a one to many relationship and there does not have to be a one to one pairing. Thus, the user could have two TRS 114 systems and ten METS 150 remote systems, with each TRS 114 system communicating some or all of the ten METS 150 remote systems.

Figure 5:
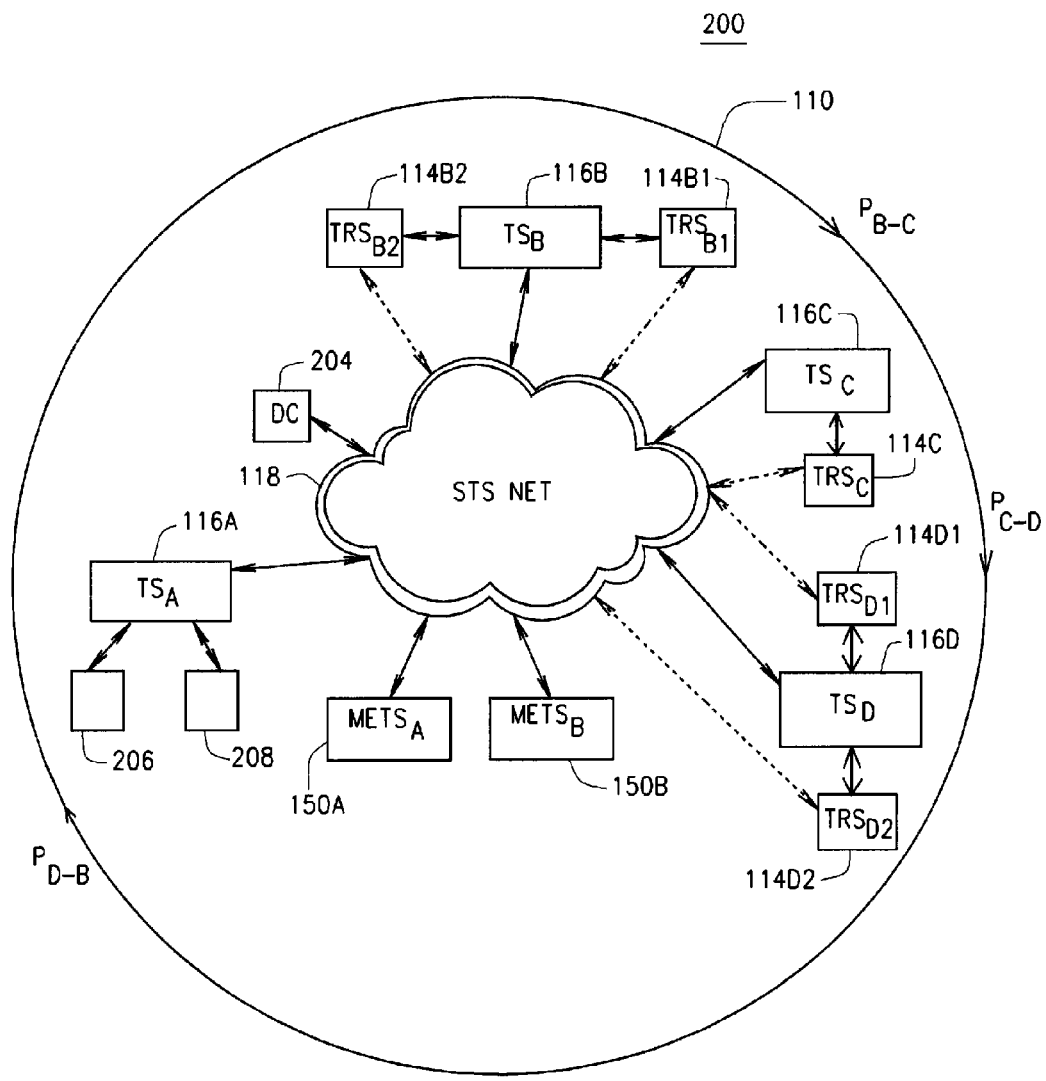
FIG. 5 is a schematic drawing showing the system architecture of the communication system suitable for use with one exemplary embodiment.

FIG. 5 is a schematic drawing showing the system architecture of the communication system suitable for use with one exemplary embodiment. As shown in FIG. 5, timing system $TS_A$ 116A is not paired with a detection system. Rather, timing system, $TS_A$ is equipped with a Graphical User Interface 206 and input system 208. Together, the Graphical User Interface 206 and input system 208 are configured to allow either manual entry by a human user or electronic entry from an outside system, and interacts with a database application for storing a plurality of participant data in the memory wherein each participant data including a participant identifier for uniquely identifying each participant, along with other participant data, without limitation, including contact information and group affiliation. Graphical User Interface 206 and input system 208 may be implemented in any suitable application programming environment, including but not limited to the Microsoft®.NET Framework.

The exemplary embodiment shown in FIG. 5 depicts two timing auxiliary systems, $STAS_A$-$STAS_B$ 210A, 210B. Timing auxiliary system, $TAS_A$ 210A is equipped with a display 212. The display 212 may include, but is not limited to a computer monitor, message board, time clock or any other display device. Timing auxiliary system, $TAS_A$ 210B is configured with suitable computer executable instructions for using the integrated communication interface timing system TS and TRS to communicate with other timing auxiliary systems, such as $TAS_B$, and one or more of the timing systems, $TS_A$-$TS_D$ over the communications network 118. In an exemplary embodiment, timing auxiliary system, $TAS_A$ may function as a remote controller, coordinating the communications between the other timing systems 214 and timing auxiliary systems.

In the exemplary embodiment depicted in FIG. 5, timing system $TS_A$ 116A may function as a participant check-in location, timing system $TS_B$ 116B may be positioned near the starting line of the race within two or more tag reader systems, $TRS_{B-1}$, and $TRS_{B-2}$. Timing system $TS_C$ 116C may be positioned at an intermediate point between the starting and finish lines and have two more of its own tag reader systems $TRSC_{-1}$ and $TRS_{C-2}$. Timing system $TS_D$ 116D has two or more tag reader systems $TRS_{D-1}$ and $TRS_{D-2}$ positioned near the finish line of the race.

One skilled in the art will recognize that the system may be configured to include more or fewer timing systems and more or fewer timing auxiliary systems as the configuration of the race course or quantity of participants would dictate. Additionally, the exemplary embodiment of FIG. 5 as shown depicts a circular racecourse over which one or more laps may be run. One skilled in the art will recognize that any course configuration may be supported by providing an appropriate quantity of timing systems, TS 116, TRS 114, and METS 150 arranged in a manner suitable to cover the entire course.

During operation of the system, a participant P, wearing an RFID tag suitable for detection by each of the RFID tag reader systems TRS would begin near timing system $TS_B$, travelling along the path $P_{B-C}$. As the participant nears $TS_B$, the tag reader systems $TRS_{B-1}$ and $TRS_{B-2}$ will detect the participant's unique identifier or other participant data, record participant timing data, which constitutes part of the participant data, which includes the determined time of detection of the participant in proximity to a detection point at the location of $TRS_{B-1}$ and $TRS_{B-2}$ system. Timing system $STS_B$ may then use the integrated communication system to communicate the participant data to one or more of the timing systems, $STS_A$, STS$_C$-STS$_D$, or timing auxiliary systems, STAS$_A$ STAS$_B$ over the communications network STS NET. As the participant continues along the path P$_{C-D}$ through path P$_{D-B}$, timing system TS$_C$ receives tag reads from its tag readers TRS$_{C-1}$ and TRS$_{C-2}$ and TS$_D$ receives tag reads from its tag readers TRS$_{D-1}$ and TRS$_{D-2}$. In this way, the collective system is able to track the progress and timing of the event participant as they traverse the racecourse covering paths P$_{B-C}$, P$_{C-D}$ through path P$_{D-B}$.

Figure 6:
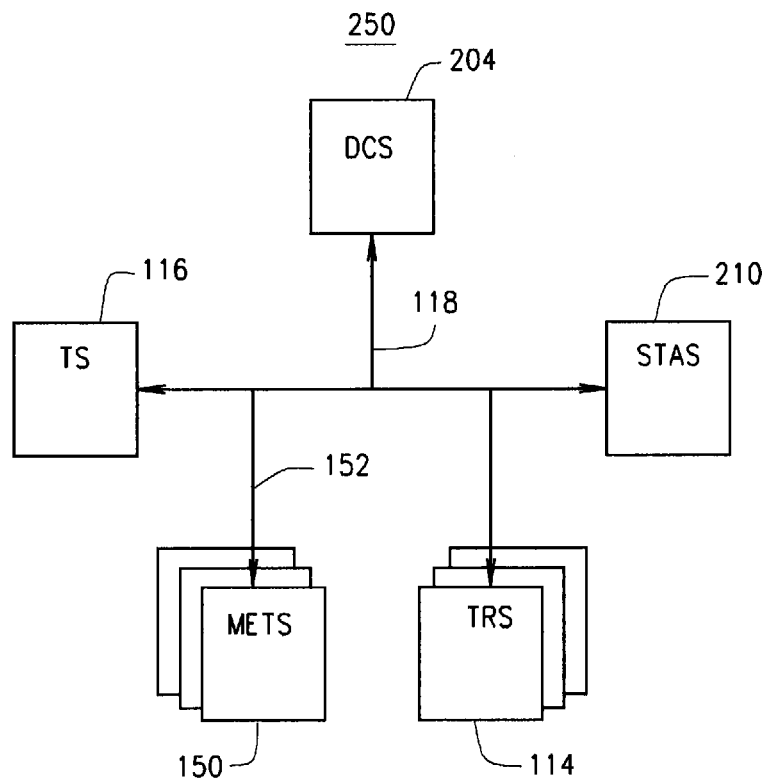
FIG. 6 is schematic drawing showing the communication interfaces for an integrated timing system (ITS) and tag reader system (TRS) configured for compatibility with a METS remote system according to one exemplary embodiment.

FIG. 6 is schematic drawing showing the communication interfaces for an integrated timing system (ITS) and tag reader system (TRS) configured for compatibility with a METS remote system according to one exemplary embodiment. A typical METS ITS communications architecture 250 can include a Distributed Clock System DCS 204, one or more timing systems TS 116, one or more auxiliary timing systems STAS 210 and METS remotes 150 as well as the other ITS system components. The METS remotes 150 can include any type of computing platform without limitation.

Figure 7:
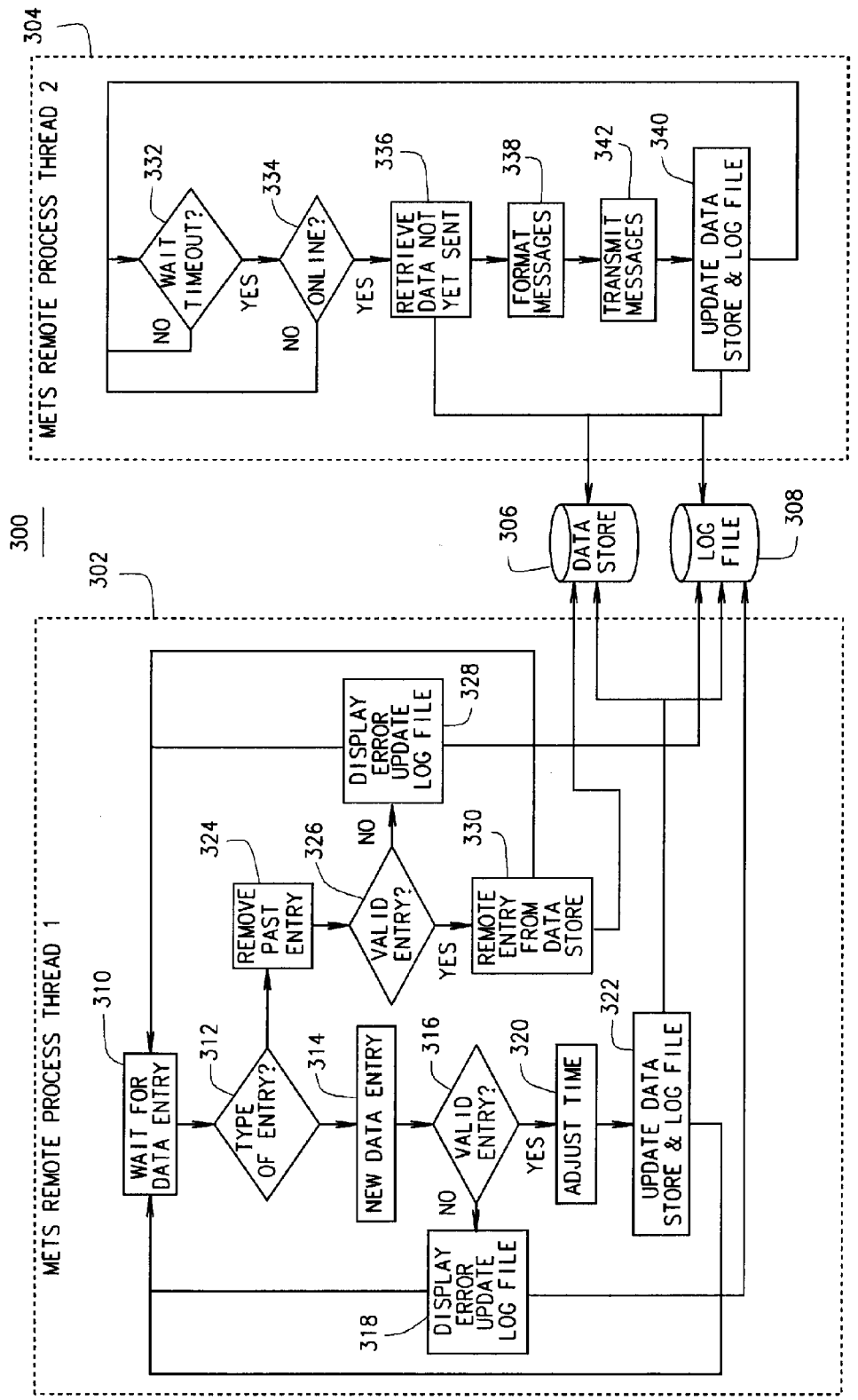
FIG. 7 is a flow chart illustrating two process threads of methods of a METS remote system according to one exemplary embodiment.

FIG. 7 is a flow chart 300 illustrating two process threads of methods of a METS remote system according to one exemplary embodiment. The following describes the individual functions. There are two action threads illustrated, a first thread 302 and a second thread 304. The two threads are related or coupled by their interactions with the data store 306 and the log file 308.

First thread 302 of the METS remote 150 starts at process 310 with the METS remote 150 waiting for a data entry from the user. Process 310 waits for the user to enter a tag serial number, participant's name, or any other key field that is being used to identify a participant in a sporting event. In process 312 the user enters user data and the process 312 determines the type of entry of such user entry. If process 312 determines that the new user data entry is new data, the process continues through process 314 to process 316 where the user data is analyzed as to whether the new data entered is a valid entry. Process 316 analyzes the entry and verifies that the information is either a valid serial number or a text field with at least one text character.

If process 316 determines that the new user entered data is not valid in process 316, a display error is generated on the METS user interface 154 by process 318. Process 318 also updates the log file 308 to indicate the error and thread 302 is returned to the wait for data entry in process 310. If the process 316 determines that the entry is valid data, the time is determined and adjusted in process 320 by the stored offset. Process 320 automatically deducts or adds time to the manually entered time entry or the time as determined by the METS clock to enable METS 150 to compensate for the participant's time in the event that the data entry was slightly ahead or behind the actual time that the participant crossed a monitored point. After adjusting the time in process 320, process 322 updates the data store 306 and the log file 308 with the data entry that include the entered bib number or name and the adjusted time from process 320. Process 322 stores the entry in a permanent data store 306 as well as a log file 308. The log file 308 and the data store 306 can be read by third-party programs and each file is comma delimited with the user data entry and time of entry. As such, the METS user interface 154 can provide for a screening to ensure that a user does not enter a comma into the data entry field.

Going back to process 312, if process 312 determines that the entry is not a new data entry, process 324 removes a past entry that is viewed as being a duplicate and then checks in process 326 whether the new duplicated entry is a valid entry. If it is not, then process 328 displays an error on the METS user interface 154 and updates the log file 308 to indicate the error. Thread 302 then return to process 310 to wait for data entry process 310.

The second thread 302 addresses the communication of the user data files with the ITS 116 and/or TRS 114 systems that are configured for receiving the manually entered tag entries and times of the METS remote system 150. Thread 302 starts at process 332, which is a wait timeout process. If the METS thread 302 determines in process 332 that the has time has run, then the process 332 continues to process 334 to determine if the METS remote 150 is on line and communicating over the METS interface with the intended ITS 116 or TRS 114 METS enabled systems. If the time has not run, process 332 returns to the start. If the METS remote 150 is not on line, the process 334 returns thread 304 to the start. If process 334 determines that the METS remote 150 is online, thread 334 continues to process 336 wherein it is determined whether the retrieved or user input data has been sent or is still waiting to be sent. If the user data has not been sent, process 338 formats the user data into the appropriate message format for transmission in process 338. In process 338 the entry information is formatted into a message using one of the two standard READ messages. The choice of which message is created is based on the original entry itself. If a serial number was entered, the READ message using the tag serial number is utilized. If a name or any other text entry was made, the second READ message is created with the participant name or other key text information. Process 342 transmits the formatted message from process 338 over the communication interface of the METS remote system 150. Process 342 can provide that the message is added to a network buffer that contains all entries that are being queued up for transmission to a system or device over the communications network 152.

After the transmission occurs in process 342, thread 304 continues to update the data store 306 and the log file 308 with the transmitted message details. After this, thread 304 returns to the wait timeout process 332. Referring back to process 336, if process 336 determines that the message or user data has already been transmitted, the process is noted and updated by process 340 to include updating the data store 306 and the log file 308 and process 340 returns thread 304 back to the wait timeout process 332.

This method provides that the user's data entries can be stored in a buffer and have a unique time stamp assigned to them that is 10 seconds beyond the time of original entry. This 10-second window provides enough time for the user to cancel the entry in case of a data entry error. Once the timeout occurs in process 332 on an individual entry in the buffer, it is sent to the next function where it is formatted and prepared for transmission over the communications network 152. Process 338 illustrates that the READ message is only formatted and transmitted after timeout has occurred. The timeout is suggested to be 10 seconds from the time stamp of the manual entry (assumes this the actual time stamp and not the adjusted time stamp). Process 332 indicates that up and until the timeout occurs, the METS remote system 150 in thread 304 resorts back to wait for data entry. There can be a message or report or otherwise to prompt the user to re-enter after the verification. Until the timeout occurs, the current illustrated flow provides for a user override by a new entry in A.

The METS remote system 150 thus provides for various timing capabilities to ensure that an accurate timing record or entry is obtained. For instance, a 10-sec "time stamp" for user entry override option, here are my thoughts on the process as related to the timing:

i. the user enters a text or numeric tab serial number via the METS User Interface 154, ii. the METS system time stamps the entry based on the original time entered as determined by the internal clock of the METS, iii. the METS applies a time adjustment based on factors to determine an adjusted time entry associated with the user entry data to form an Event Entry (with the adjusted time), iv. if the network is up and the METS is not operating in Off Line mode, the Event Entry is stored in the buffer that includes a buffer entry time stamp that is the original time entered plus 10 seconds, v. the Buffer releases the Event Entry to the communications module for formatting and transmitting after the passing of the buffer entry time stamp and if no user override is received via the UI.

FIG. 7 illustrates just one embodiment of METS remote system 150 processes that are within the scope of the present disclosure related to user entered timed events. This particular embodiment provides:

a. Where an authorization fails, the system can prompt the user that the tag number entered was not valid and to reenter. This can occur regardless of the mode the user interface module.

b. Generally the time can be adjusted regardless of mode.

c. The storing and log files can occur regardless of mode.

d. A timeout check can ensure that that the user does not override or change the entry and therefore cancel the entry before it is finalized as either a transmission to a METS system or a permanent stored file, as such, the network buffer entry may apply to the on-line mode and not to the off-line mode in some embodiments.

e. The formatting of the message can be either only upon creation of the need for a READ message to be transmitted at an output, or it could also occur in the off-line mode to be stored in an output file for subsequent output as a group file. There can be an indexing or tracking of the tag read files to identify those that have been previously sent versus those that have never been sent, and therefore still need to be sent.

FIG. 8 is an illustration of the format for the variable length METS packet message messages according to one exemplary embodiment.

illustrates a variable length message information packet structure that is used to communicate event data. This packet may contain any type of information and the format of the packet includes the following: message type, source, custom field(s), and end of message indicator. Several message types are already defined, as documented below. However, the message type may contain any text that uniquely identifies a message. The system receiving the message will use the message type to determine the action required. The next field in the packet includes the source. The source is a name or unique identifier that indicates which system transmitted the message. This information is used by the receiving system to know where to send a response. The source field can include any text, but typically the IP address of a computer or device is used. The next fields within the packet are customer fields that may contain any type of information. The flexibility of the protocol makes it possible to send any type of information from one system to another. The final field that should be included in each information packet contains EOMI. This is the end of message indicator that is used by the receiving system to know when all information within a packet has been received. The packet also uses the | character to delimit each field.

FIG. 9 is an illustration of the formats for an exemplary set of METS messages according to one exemplary embodiment.

There is shown the pre-defined information messages provided within the protocol. The following describes each message:

(A) Read message (READ). This message can be sent from a system that has just read a participant tag. The message could be sent to any other device(s) and the message includes the tag serial number just read. It also includes the time of the tag read as well as an optional packet number. The READ message is the primary information packet used to communicate tag read data to all devices. The packet could be expanded to include additional fields as necessary.

(B) Read message (READ). This message can be sent from a system that has just read a participant tag. The message could be sent to any other device(s) and the message includes name of the participant that corresponds with the tag serial number just read. It also includes the time of the tag read as well as an optional packet number. The READ message is the primary information packet used to communicate tag read data to all devices. The packet could be expanded to include additional fields as necessary.

(C) Re-send message (RESEND). This message can be sent from a receiving device to a transmitting device to request another send of a particular packet. If packet numbers are being used for the purpose of verifying that all packets are received, the re-send message can be used to request another transmission of a packet that never arrived at the receiving device. The packet could be expanded to include additional fields as necessary.

(D) Time Sync (TSYNC). This message can be sent to all devices on the network to indicate the current time at the transmitting device. This message is used to synchronize the time on all devices, which is crucial for RFID systems that are used for timing sporting events.

(E) Look up (LOOKUP). This message allows a device to request race information from another device. The identifier may be any text. In most cases, the identifier will be a tag serial number, race bib number, participant name, or perhaps a unique identifier that refers to a particular type of information. For example, if a device needs to know the current duration of a race, the LOOKUP message could be sent to a time system that is tracking the total race time. The identifier field might contain the text entry "RACETIME" and this entry could be used to indicate that the race duration is desired. The packet number field is optional and if not used, the field could contain a single space.

(F) Command. This message could be sent to a device to request that a particular command be executed. The IDENTIFIER field may contain any text desired. This field could be used to send any tag reader or participant detection system command to a remote device. For example, if the current battery charge level on a remote system needed to determined, a Command message could be sent with the text BATTERYSTATS in the IDENTIFIER field. The remote system would need to have functions built in that can process the command.

(G) RSIG. The RSIG message is sent using METS-ITS to any system that is listening for RSIG command. This is typically used by ITS METS to make sure the connection over the network is good to METS-ITS and also to verify that METS-ITS is scanning and listening for METS entries.

(H) RQIMAGE. The RQIMAGE message is sent to a device to request that a particular image be returned. The message is useful when interfacing with a system that contains photographs or other pictures such as logos or artwork. The IDENTIFIER field should contain a unique descriptor for the image desired and may contain any text desired. Typically, this field will contain a unique number for a participant in an event. However, the IDENTIFIER could also contain a specific location on a METS system where a file is located.

(I) STIMAGE. The STIMAGE message is sent from a system responding to a request for an image, e.g., RQIMAGE. The IDENTIFIER field should contain the unique descriptor for the image that was requested and that may contain any text desired. Typically, this field will contain a unique number for a participant in an event. However, the IDENTIFIER could also contain a specific location on a given system where a file is located.

The STS-ICS facilitates and streamlines the communication of tag reader or participant detection system timing information between multiple computers used at sporting events. The protocol is flexible and adaptable and can be used to transmit any type of information across any type of network. The use of variable length messages makes it possible to customize the messages sent or received from any type of device. The protocol is simple and efficient and can be quickly implemented.

The foregoing descriptions of specific embodiments of the present design have been presented for the purposes of illustration and description. They are not intended to be fully exhaustive or to limit the design to the precise use, form, or methods disclosed, and it is obvious that many modifications or variations are possible in the light of the information provided above. The embodiments were chosen, shown, and described in order to best explain the concepts and principles and the practical application of the design, thus providing others skilled in the art the ability to best utilize the design and various embodiments with various modifications as are suited to the particular use desired.

ITS Enablement of METS

An ITS system can have the option once is implemented to allow for the receipt and inclusion of METS remote received manual chip reads. For example, an Allow -BIB#- Manual Entries instruction can be used to clear database times and also Import -Bib entries in an Output File. When using a METS with an ITS at an event or race, the user may need to use the METS remote to enter and manually track the Bib # entries for those participants whose chip was not successfully read. However, if the user accidentally enters the wrong chip number, the user may want to remove that entry. This option, when checked, allows the user to back out an entry in the database. The entry removed is based on which database mode the user is currently using and it only works with single database modes. For example, if the database mode is set to Finish only, and the user enter -BIB#- and press Enter, the time in the Finish and Elapsed column will be reset to 00:00:00. If the user has the database mode set to Split 1, the time in that column would be reset to 00:00:00. This feature does not work with multiple database modes such as Split 1 & 2 because would not know which time to clear. When the user enter the bib number, the user should type the - before and after the bib number. This prevents someone from accidentally typing in perhaps -95 and removing a time when the user meant to type in 95 to actually record a time. Notice that the - key is very close to the 9 key on most numeric keypads. Thus, if the user truly wanted to clear the time for bib 95, the user would type -95- and press the Enter key. This feature also allows the user to import files from other ITS systems that may have a -bib number in their data and have those times cleared in the database.

The ITS system can also include the ability to synchronize the clocks of the one or more METS remote systems with the other ITS system components such as the TRS systems. In this embodiment, a Send Automatic Time Sync instruction can be sent to the relevant ITS components every couple of minutes, such as described herein as a heartbeat. The subsequent TSYNC message as described herein can be automatically sent out from the primary time clock to the other ITS system components including the METS remote and TRS systems as described above.

ITS METS Remote Output File

The ITS system can be configured when equipped for METS to allow the user to define the output file that will be used to store METS received chip reads coming from the METS reader. The METS Remote Output File can be a standard text file that contains some basic information including the number of the antenna that last read the chip, the chip number, and the time of the read. This output file can be read by Microsoft Excel, any text editor, and virtually any database. The file is really used as a backup in case of a system failure. The output file can be used to reconstruct a database. For example, if the user has the own SQL database engine and the user wish to record the chip reads in that database, the user will want to use this text file. In addition, if the user is using a third-party race scoring system such as Race Director or Runscore, this file will be helpful to the user since both programs can read it directly. Most users can simply use the built-in database within the ITS. It will automatically manage the complexities of race timing and save the user a lot of effort.

ITS Initiated METS Input Offset

The ITS METS system offers a manual level of timing redundancy to maximize the chances of reading chips successfully. The METS remotes are usually portable and located at a position spaced apart from the TRS monitored point such as the finish line. In fact it is possible that volunteer "finishers"

The user can accomplish this by having two ITS at any monitored point. For example, if the user wants to maximize the read success at a finish line, the user might have a second system placed 20 feet behind the finish line. By having a second set of antennas and a second reader, the user receives two benefits. First, the user has a second system looking for chips, which improves the chances of reading a chip at the finish line. Second, in the event that a single system failed for any reason, the user has a second system capturing chip times. If the user elect to use two ITS at a single monitored point, the user can use the Reader Offset to compensate for the time differences between the locations of the two systems.

When a runner crosses the finish line, if their time is recorded as 10:15:00, they finished the race at 10:15 in the morning. When the runner crosses the second monitored point that is 20 feet behind the finish line, the system reads their chip at 10:15:01. Most runners will take from 1 to 2 seconds to traverse the additional 20 feet. However, it is preferred that record a time, at the second system, that is closer to the time recorded at the finish line. Thus, the ITS system could set the offset time value to −1 seconds, and the ITS system will subtract 1 second from the chip time being recorded at the backup system. Thus, the time stored in the database will be 10:15:00, instead of 10:15:01. This makes the finish time much more accurate. The ITS system will typically read most chips quite well. However, if during a 5K race, the finish line system missed five runners, the database time for the finish line is highly accurate for all but 5 runners. The user can now import the database from the backup system and only the five missing times are actually needed to fill in the missing times for the finish line system. Thus, five times captured at the backup system are used, and because of the offset value, they are reasonably accurate.

The ITS system is less likely to miss reading a chip at both the finish line and backup line when redundant systems are used. This is particularly true when the runners have the chips properly worn on their race bibs. In other words, when two systems are operating in parallel at the finish line, the users are very likely going to achieve good read rates. Even if the user finds that a chip was unable to be read, the Bib # Entry box allows the user to capture that time. If the user wishes to place a redundant system in front of the finish line, the user can instruct the ITS remote to add from 1 to 5 seconds to the time being captured. For example, if the redundant system is 25 feet in front of the finish line, the user could set the offset to 2 seconds, which will automatically add 2 seconds to the time recorded at that system, thus the time is more accurate of their actual finish time.

TRS Initiated METS Input Offset

In some embodiments, the ITS system TRS RFID reader components can be configured to provide an updated determined or calculated METS Input Offset that can be sent to the METS remote or the ITS system for use is providing an improved offset to the manually input METS remote entries. The TRS can be configured to calculate the offset that should be used by the METS remote systems through transmission of the TROFFSET message to the METS remote or the ITS system. The TRS or ITS system can determine the dynamic value of the METS reader offset based on a number of factors that can be changed as the performance of the system or the performance of the participants change. For instance, the ITS or TRS system can determine the METS remote offset based on the speed of the participants before and after the passing of the primary monitored point or between the primary monitored point and the secondary monitored point, or thereafter. The ITS or TRS system can determine the METS remote offset based on the distance between the location of the METS remote and either the primary or the secondary monitored point. This can be based on local distance calculations or on an input GPS feeds from each. Of course, this calculation and determination can also be made by the METS remote itself if so equipped. Other factors can also be used as known to those of skill in the art. The amount of the time offset in the TROFFSET message is likely to change during a single event as the first set of participants are likely to have a faster speed at the finish, more or less change in velocity and a different deceleration than participants that pass the monitored point later in the race. As such, the value of the TROFFSET can be calculated dynamically based on the TRS tag reads, determination of the velocity, acceleration or deceleration of the participants, and within a particular number of such within a particular period of time. Such dynamic determination of the TROFFSET time value can significantly improve the accuracy of the METS remote manual entry to more accurately reflect the time of passing of the participant at the monitored location.

This value can also be updated or based on a comparison of a manually entered METS time entry for a tag that was actually read by the TRS system as another example.

Output File Merge Report

This report is a very powerful and sophisticated tool that is rarely used for most races. However, its purpose is to provide extreme levels of redundancy for chip timing at events in which the user want to maximize the chip reads at a finish line.

A single ITS at a typical finish line for most events should read well as long as the chip is being worn properly and is actually on the participant. When a second the ITS system is used at a finish line, the combination of the two systems greatly enhances the chances of reading the timing chips. Nonetheless, it is still possible that a missed chip read could occur. This can happen because the chip may have been accidentally damaged by the runner, or perhaps the chip was accidentally removed from the bib or other surface where it was placed. If the user has timed enough races, the user knows that strange things happen that are often out of the control. Nonetheless, the user may need to time a race in which it is critical that the user maximize the read success. Thus, the user has an option that will improve the read success.

To guarantee maximum redundancy and success at this unique race, the user will also have an operator at the back of the finish chute that is using our Remote Entry Software (METS) to simply enter bib numbers for every person that has finished the race. This extra operator is simply making sure that every participant's race number has been keyed into the system. If any runner has lost their bib number, the operator can simply key in their name as well. The result is that the user has an output file being created by this backup operator that contains a list of bib numbers.

The Output File Merge Report scans the output file created by at the finish line, looking for entries that contain a 0 for the bib number. In other words, it finds every entry that the operator made at the finish line when they could not see a bib number and simply pressed the Enter key. When they pressed the Enter key without a bib number, a 0 was written to the output file along with the time. Thus, has a finish time, but now needs to figure out who belongs with that finish time.

It now scans the Output File that came from the computer running the METS software. The user will actually copy this file from the computer onto the hard disk of the ITS at the finish line. The report now matches up the race finishers based on numbers and times and reconciles the two output files. The result of this complex but quick process is that the user will have a new output file. This file contains the combined results for the race with all the bib numbers of all of the participant contained in it. The user can then load this output file into the ITS as the finish times for everyone in the race. The user could also load this file into a spreadsheet or any other program.

ITS Database File

The ITS system can include a high-speed binary database that runs in memory and is updated very rapidly when chips are being read. When this database is saved to the disk drive, it is written to a text file using a comma-delimited format. This allows the file to be read by third-party programs without having to build a complex database interface. For example, Microsoft Excel or Notepad can directly read the file.

The following is a sample database file record: 1,Jay Cooper, 08:00:00,08:15:00,00:00:00,00:00:00,00:00:00, 08:45:00,00:45:00,50,Half Marathon,M,Allentown,Team Cooper,50001,Club Member,#76435,137

The ITS system can have the capability to automatically write out the database during a race to a file name selected by the user.

The following is one exemplary format for the database file: Bib#,Name,StartTime,Split1,Split2,Split3,Split4,FinishTime,ElapsedTime,Age,Division, Gender,City,TeamName,ChipField,UserField1,UserField2,UniqueID The Bib # field will contain a value from 1 to 99999 depending on the version of the ITS system in use.

The Name will contain the full name and is typically formatted as FIRST NAME LAST NAME with no comma between the first and last name. The user should not include a delimiter of the ITS system in this field. If the ITS system uses a comma for example, the user should not include a comma in the name field, of course other delimiters are also possible. When the ITS system loads the database file, it uses the comma to determine the individual fields. Thus, if the user place a comma in the Name field, the user will cause ITS to use the wrong fields for the remaining entries on the line being read.

The following fields all contain a time based on the time of day: Start Time, Split1, Split2, Split3, Split4, Finish Time. All of these fields are in the format HH:MM:SS and there are no quote marks.

The Age field will contain up to three digits typically ranging from one to 100. The Division field will contain a text entry that can be up to 250 characters in length, although it is typically 20 or less characters long. The Gender field will contain a text entry that can be up to 250 characters in length, although it is typically one character with either an M or F entry. The City field will contain a text entry that can be up to 250 characters in length, although it is typically 25 or less characters long.

The Team Name field will contain a text entry that can be up to 250 characters in length, although it is typically 25 or less characters long.

The Chip field is reserved for a future update. It will contain a text entry that can be up to 250 characters in length, although it is expected to be six or less characters long.

The UserField1 field will contain a text entry that can be up to 250 characters in length, although it is typically 25 or less characters long. This field may be used by the software to contain values related to team order for relay races. In some embodiments, the user will place information in this field related to the user's personal information such as emergency contact number.

The UserField2 field will contain a text entry that can be up to 250 characters in length, although it is typically 25 or less characters long. This is a second field that often contains additional personal information about a race participant.

The UniqueID field will contain a text entry that can be up to 250 characters in length, although it is typically 10 or less characters long. This field is often used to track race-day registration numbers or other unique values that identify a race participant. ITS can automatically insert a unique value in this field during the rapid registration process in the software.

Not only will ITS write this text file to the disk drive, it will read it back in. Thus, the user could create a database file using this format and the ITS system may read it just fine. It is important to make sure that any time fields the user creates are in the HH:MM:SS format with leading zeros on any times that are less than 10. For example, if the time is 9:10 am, the field should contain the entry 09:10:00. In most embodiments, if the user are creating a new file that will be loaded into ITS, the time fields should contain 00:00:00. However, if the user has a race with assigned start times, the user could load them into ITS as well by using the StartTime field.

METS Interface and Protocol Messages

The METS and one or more components of the ITS system can have a state-less UDP network interface that is used for outbound and inbound messages. These messages include outbound packets from ITS for READ information, as well as other data. In addition, METS and ITS can listen for messages from other ITS systems or third-party programs. This interface allows third-party programs to be developed which can work within the ITS architecture.

METS Network and Web Settings

In order for METS to communicate messages from any ITS system or component, the METS and ITS systems should have the network values set in the communication program software. The ITS system with METS has a powerful networking protocol that allows the user to interface to third-party applications, programs the user may have written, and to a number of add-on software programs that provide enhanced functionality. The networking options allow the user to define specific locations and networking interfaces that will be used to provide real-time race information including chips read as well as race participant information. These settings should not be changed unless the user has a complete understanding of how interfaces with third-party programs.

METS Sockets

As METS is processing messages coming from ITS, it may determine that an error has occurred in the message that was received. If this is the case, it will request that ITS send the message again. To do that, it needs to know the Socket Value that the ITS system is listening on for inbound messages. In the Defaults screen of ITS, there is a value set in the Listen Socket box. That value should be typed in the Sender Socket box on this METS configuration screen.

When the ITS system is communicating with other systems, it sends that information to an address on the other computers. That address is called a Socket in the networking world. The software running on another computer advertises that it is listening for messages on a given Socket. It is much like the telephone system. The user has a phone number that other people can call. In essence, the phone number is much like a socket in the ITS system. If someone sends information to the socket, the user will receive it. Thus, for the ITS system to send information to a one or more METS systems, the ITS system component tasked with such communication needs to know what socket that METS system is listening on. Thus, the Remote socket is like the phone number for each METS system. For example, the Remote Socket for a METS system can be 6000. In other words, the METS system will be listening on this number for any messages sent from an ITS system component. All METS systems can listen on the same Socket and thus they can all receive the same message. In other words, the ITS user instructs any ITS system that wants to transmit a message to a METS system to transmit it using the Socket 6000. Similarly, each METS system can also be programmed to transmit to one or more other ITS components based on their Socket address. For example, a primary TRS systems can have a Remote Socket address assigned such as Socket 6010, the secondary TRS system set for Socket 6020 or it can be assigned the same as the primary at Socket 6010. The ITS system can have a different Socket 6200, but can also be programmed to listen to Sockets 6010, 6020 and/or 6000, to monitor all traffic and communications.

However, it takes more than just a Socket value to reach an ITS system component such as a METS system. It also takes an IP address. For example, at the ITS system there can be an input for identifying the IP address for any of the ITS system components including the METS system. For the METS system, for example, the ITS system user can enter an IP address for the METS system as Remote Name/IP associated with the Remote Socket for the METS system. The user needs to enter into the ITS system the IP address where the user wants the message sent. Think of the IP address as a long area code in our telephone analogy. The ITS system needs to tell what part of the country the message should go to. In the networking world, an IP address looks like the following: 192.168.1.100. It is usually four different numbers with a period between them. These numbers define where in the world the user wish to send the message. In most embodiments, the user will be focused mostly on the last number, which can range from 1 to 255. This last value actually defines which computing platform that is attached to a local network the user wish to reach from among the plurality of computing platforms/computers. For example, if the MESTS user is using a laptop is connected to the ITS system via a Wi-Fi router, the user might be assigned number 120, and the full IP address might be 192.168.1.120. In an exemplary embodiment, if there are more than 255 computers on a network, the previous digit might be changed from a 1 to a 2. Thus, if one wanted to reach computer number 350 in a company, the user might need to use an IP address of 192.168.2.100 as that would be the location of the computer on the network. Notice the third value was changed from a 1 to a 2. As the user should know by now, these last two number ranges can support up to 255×255 total computers . . . about 65,000 total PCs.

In most embodiments, the ITS system related network will have less than 250 computers, so most of the present embodiments are concerned with the last digit in the IP address. If the ITS system user wants to only send messages to one ITS system component such as a METS, the user can place the IP address for that METS system computer in the Remote Name/IP field. However, the address for the PC could change every time it is powered up, if so set the last digit to 255 and the message will be sent to all PCs on the network. The value of 255 is special in networking and it means to send the message to everyone, thus anyone on the network of 192.168.1.XXX will receive the message. That works just fine because the ITS system is also using the Socket value to make sure that a receiving PC knows that the message is also for them. The Remote Socket and the Remote Name/IP work together to tell how to communicate with other systems.

The ITS system can be configured to include define each ITS and/or METS location by entering each particular IP address that contains the name the ITS component such as the METS system associated with the IP address. This can be used by the ITS system or other components thereof to provide additional information related to a received chip read. For example, this can be used to identify that the chip read was received from a particular METS system, versus another METS system or versus a TRS RFID tag reader at the primary or secondary points. For example, if the user is using at a split point on the course called Split 1, the user can send the chip reads over the network to the primary system at the finish line and the user may wish to have them stored in the Split 1 column. Thus, the user could use the My Location entry to Split 1. If the user is using to send chip reads to another ITS component, the user can place the word Finish in this column and it can be used by that system, such as for a display or otherwise This explanation also applies to the Listen for Messages Enabled box. The user will simply check the box and tell it can receive messages from other systems.

As addressed above, each ITS system can be programmed to listen to one or more Sockets on the communication network. The listen socket instructs the ITS system component such as the METS system to listen for messages on that socket value. These messages may include chip reads or other types of data as will be discussed in more detail below.

The Listen Socket value is the network number that METS will use to listen for messages. In the networking world, there are unique addresses much like a street address for the home. In order for software programs to reach another program over the network, it needs to know the address of the destination. The number of addresses in a network can be quite large, but METS will restrict the number range to a value from 5,000 to 9,999. This would allow the user to have up to 5,000 METS systems running at the same time! In one embodiment, METS comes pre-set when the user purchases the ITS system to a value of 6000, but the user can change that at any time. In this exemplary embodiment the value 6002 is used since by design choice the ITS system defaults are set to this value at the factory to send information to any program listening on 6002. As known to those of skill in the art, the user could change these values to any number from 5,000 to 9,999. When the user enter the value, some embodiments should not include commas as the ITS system as a common can be used by the ITS system as a delimiter. Simply enter the value, such as 6000. The value the user use for the Listener Socket should match the value set in the ITS defaults for Remote Socket. For example, in one embodiment an ITS system can have a default value for Remote Socket set to 6000. The user would set the Listener Socket in METS to 6000.

As a quick summary of the Listen and Sender socket settings for METS:
 1. The Listener Socket value in METS should match the Remote Socket value in the ITS Defaults screen.
 2. The Sender Socket value in METS should match the Listen Socket value in the ITS Defaults screen.

Once the user has confirmed these settings, the user can next make sure the IP Address is set properly for the METS software.

METS IP Address

In the last couple of sections, the address for the network communications was discussed. Not only do software programs listen or send information using socket numbers, they need to know which computer is going to receive their messages. It turns out that a single computer could actually have two or more programs running at the same time, which are listening for messages on different sockets. The address mentioned earlier is actually specific to a software program, and not necessarily the computer where the software program is loaded. So, not only does the ITS system need to use a socket number (address for the software program), the ITS system also needs to use an IP address.

The IP Address value should be set to the IP address of the primary ITS at the finish line. The user can determine that address by using the System Info option in the Help Menu of ITS. METS needs to know this specific address so it can communicate over the network with the ITS. Recall that it was previously mentioned that if METS receives a message that is incorrect, it would request that ITS re-send that message. Thus, METS needs to know the IP address for the computer running the ITS software.

In the networking world, IP addresses are usually formatted to look something like 192.168.100.105. There are four numbers ranging in value from 1 to 255 and they are separated by periods. This number is the computer's unique network address in the world!

If the user wants to run the METS software on the same computer as ITS, the user could enter the phrase localhost in the IP Address box. This word, localhost, is a special way of telling the METS software that the ITS system is running on the same computer. The user can also set the IP Address in the ITS Defaults to localhost for this to work.

This concept of using localhost can be very helpful if the user is using a single computer for training or for doing a demonstration. However, the user should never run the ITS and METS software on the same computer for an actual race. It could result in decreased performance for ITS and cause the user to miss chip reads.

Another advanced use of the IP address has to do with Broadcasts. In the networking world, the user can tell a software program to send out a message to all computers on the same network. To do this, the user simply set the last value in the IP address to 255. The value of 255 is reserved and designated to be used for messages that should be sent to everyone.

Here a network IP address is set to 192.168.100.255. The last value is set to 255, so messages will be sent to any computer on the 192.168.100 network. That means that computers that are designated as 0.1 to 0.254 will receive messages sent. For example, 192.168.100.50 would receive messages. 192.168.100.165 would also receive our messages. Because these two computers have ending addresses that are within the range of 1 to 254, they will receive our broadcast message that is being sent with an address of 255.

If a computer had an IP address of 192.168.120.40, the system would not receive the messages from the ITS system. The user sees, although the last value in the address is 40, the value just to the left of that is 120, which indicates the computer is on a different network. In summary, the first 3 values in the IP address identify the actual network location, and the $4^{th}$ value designates the computer that happens to be on that network. The user may want to set the IP address in METS to have a $4^{th}$ value of 255 when the user has written his own software to communicate with METS.

Exemplary METS Messaging Packet Structure

UDP packets are ideal for use with the METS-ITS network interface as they are quick and relatively easy to implement. However, there are well-known limitations for UDP packets, and the user should be completely familiar with these limitations before the user attempt to write software that interfaces with the ITS system.

The following includes the packet structure for an exemplary METS supported UDP packets. The METS and METS configured ITS components can be configured to listen and send on any socket ranging from 5000 to 9999. In addition, ITS can be set to send to a specific computer by using either the computer name or its IP address. Furthermore, ITS can send to all computers on the network by using 0.255 as the last bytes in the IP address. For example, if the user set ITS system to 192.168.1.255, it will send its messages as Broadcast packets. All ITS message are sent as clear text contained within the UDP packet, with fields separated by | characters. |EOM| should come at the end of each message.

ITS can have a state-less network interface such as provided by a user data protocol (UDP) system as used for outbound and inbound messaging over a suitable communication network. The METS-ITS system utilizes these messages to include outbound packets using METS-ITS for READ and ANNOUNCE information, as well as other data as described herein. In addition, an ITS using METS-ITS monitors the Internet connection for UDP METS messages from other METS configured ITS system components or third-party programs coupled to the same communication network. This interface allows third-party programs to be developed which can work within the ITS architecture.

UDP packets as used by the present METS system can provide a very quick and relatively easy system to implement and from which to build flexible and robust applications. While there are known limitations for UDP packets, the describes application of the UDP packets in the METS system recognizes these limitations and adjusts the design and applications accordingly whereby UDP provides a very suitable solution for communicating between multiple ITS systems as well as sport timing auxiliary systems (STAS) in which auxiliary applications can provide vertical applications utilizing the information available within the METS system.

The following includes the packet structure for METS supported UDP message packets. The METS system including the METS reader and any METS configured ITS system component can be configured to listen and send on any socket ranging from 5000 to 9999. In addition, METS can be set to send to a specific computer by using either the computer name or its IP address. Furthermore, METS can send to all computers on the network by using 0.255 as the last bytes in the IP address. Of course in other systems and embodiments other broadcast messaging address can also be used and still be within the scope of the present invention. In this example, if the METS system is set to 192.168.1.255, the METS system sends messages as Broadcast packets. METS message can be sent as clear text contained within the UDP packet, with fields separated by the "|" characters. In many embodiments, the end of message indicator |EOM| should come at the end of each message.

As noted, the METS network interface can be configured for stateless broadcast communications systems, such as UDP using a broadcasting IP address indicator such as 255. The networking interface can however support a variety of different types of messages. These can include broadcast messages, multicast messages and unicast messages, between and among various METS enabled ITS systems and components.

In some embodiments, broadcast METS messages can be transmitted from a METS system interface over the stateless broadcast communication network with no addressing as to the intended recipient as well as no identification the METS configured ITS system component that is sending or sent the message. As such, each of the Broadcast METS messages can be read by any listening METS component, and once received by that METS component, the receiving METS ITS system component does not know which other METS ITS system sent the message.

In some embodiments, multicast METS messages can be transmitted from the METS interface over the stateless broadcast communication network with no addressing as to the intended recipient. However, these messages include an identification of the sending ITS system component including the METS remote system, e.g., FROM identifier. The METS multicast messages can be read by any METS configured ITS system component and once received by that ITS system component, the receiving ITS system component knows from which of the other communicating ITS systems the message originated. These include, by way of example, the READ, RESEND, TSYNC, and RSIG messages.

In some embodiments, Unicast METS messages can be transmitted from the METS interface over the stateless broadcast communication network with an identification of which the sending entity is (FROM identifier) as well as an identification of the intended receiving ITS system component (DEST or Destination identifier). These unicast METS-ITS messages are essentially point to point messaging within a stateless broadcast messaging communication system. Only the identified destination METS configured ITS system should receive these messages and they are ignored by all other listening ITS system. The receiving METS configured ITS system knows that the message was intended for its use and it knows the identification of the sending METS component. These include, by way of example, the RESEND, LOOKUP, COMMAND, RQIMAGE, and STIMAGE messages by way of example.

It should be understood to those skilled in the art that other broadcast, multicast and/or unicast messages can also be developed as an application may require or benefit from the present disclosure, and still be considered within the scope of the present disclosure.

Read Message (READ):

The READ packet is sent by METS-ITS to the network and can be captured by any device that is listening on the network for UDP packets. The packet is a real-time feed of any reads that are occurring at the particular ITS timing system.

Packet length=variable size
Total fields=6
READ|FROM|BIB#|TIME|PACKET #|EOM|

Packet number is a value that begins with 1 and goes to 999. Once it reaches 999, it starts over again at 1. This packet number is used to reference past messages in case a message is lost on the network and a re-send is requested. Additionally a separate READ message can be used that includes the PARTICIPANTNAME field in lieu of the BIB#.

"METS" READ Message. In some embodiments of the above READ message can be used by METS to the manually entered tag serial number that was manually entered by the user of the METS remote. The time entry can be automatically generated by the METS remote, as described herein, or can also be a time that is manually entered. The METS READ message can contains the fields identified above, but will be described here for more detail as an example of the detail of one exemplary embodiment of METS.

Generally the multiple fields that can be any length. Each field is separated by the | character, and the last field should contain the EOM| indicator. The following describes each field:

READ—This is the type indicator and it will contain the text READ.

FROM—This is the IP address or network name for the Backup system.

TAGSERIALNUMBER—This is the tag serial number that was manually entered into the Backup system.

TIME—This field contains the time when the manual entry was made.

PACKET #—The Backup system can include a sequential packet number, which allows the receiving system to know if any messages were lost during the communications process.

EOM—This is the last field of the READ message and it indicates the end of the message.

As a second exemplary embodiment of a METS READ Message, the METS remote can provide for the transmission of the system and participant's name that was manually entered, as well as the time for that entry whether manually entered, automatically time-stamped or adjusted by the offset for the METS remote that is applicable at that time. The message contains multiple fields that can be any length. Each field is separated by the | character, and the last field should contain the EOM| indicator. The READ, FROM, TIME, PACKET # and EOM are described as above, however, in this embodiment, the field PARTICIPANTNAME is the name that was manually entered into the Backup system. This field could also contain any other key identifier as long as the receiving system is aware of the identifier.

Resend Message (RESEND):

The RESEND message is sent to any ITS system requesting that it re-send a past message. If a message is lost over the network, a request to resend can be made for any of the last 999 messages sent previously. METS-ITS maintains a buffer with the past 999 messages. Once the 999 position is used, METS-ITS starts over at position 1. Thus, METS-ITS system is maintaining a circular buffer of messages.

Packet length=variable size
Total fields=5
RESEND|FROM|DEST|PACKET #|EOM|

The Destination field is the ITS system that should respond to this request. This is the same name set in the ITS system defaults for "My Name" in the networking section. If a request is made for a packet number that has not yet been used by METS-ITS, a packet response starting with the BLANK field can be received.

Time Sync Message (TSYNC):

The TSYNC message is sent using METS-ITS to any ITS system that is listening for Time Sync commands. This is typically used by ITS and METS to make sure the time on the METS laptop is the same as that on the ITS system. There can always be a slight delay in the network transmission, and as such a 0.25 to 0.5 second delay may be added to the time received using METS-ITS to compensate for the delay.

Packet length=variable size
Total fields=4
TSYNC|FROM|TIME|EOM|

The FROM field is the name set in the ITS Defaults as My Name.

As another exemplary detailed description, the METS TSYNC Message can be received at the METS system remote along with other ITS system components for the purposes of synchronizing the time with any other system on the network. This ensures that the METS remote system is using the same time, which is often required or beneficial for RFID timing systems used at sporting events.

The TSYNC message capability can provide any desired accuracy. In one embodiment, it can provide a level of accuracy around $\frac{1}{10}$th of a second wherein the time stamp is to a one-second period for the tag reads. In other embodiments, the system can be configured to enable $\frac{1}{10}$th or even $\frac{1}{100}$th second time stamping on tag reads and in such embodiments, the TSYNC message enabled accuracy will become even more important. In some embodiments, when a system receives the TSYNC message, the local clock time on the receiving system is adjusted immediately. In other words, the PC clock on the destination computer is adjusted right away.

The TSYNC message can be used for distributing a standard time to each of the connected RFID Tag Reader Systems (TRS) systems, the METS remote systems or any other ITS system component that may need to record or stamp a time, message or event. In one embodiment, the TSYNC message is a simple pushed time such that all receiving devices, such as receiving TRS systems and METS remote reset their internal clocks to the time as received or specified in the TSYNC message. Additionally, ITS component system including the METS remote can be adapted to adjust its internal clock from the exact time specified in the TSYNC message to account for transmission system delays or variances, as may be known or predicted.

The ITS primary or supervising system, may be a ITS user console or another system including one of the TRS systems. The selection of the standard time within the ITS system configuration can be selected based on the expected accuracy of the computer clock for such device or can be based on its physical location within the network or course. The ITS software provides for an initialization of the synchronization of all or some of the coupled TRS systems and the METS remotes. This can be manually initiated by a user of such system or can be configured as a part of an automated routine or process.

In some embodiments, the TSYNC message can be re-transmitted as an automated heartbeat message to provide for regular updating and to account for operational variances, as well as to provide reference times to provide updating where communication links may not continuously operate. As described herein, the Sync message can be transmitted to ITS components and the heartbeat message can support less expensive or complex systems that have clocks that less accurate and can drift one or more seconds over a 24 hour period. This can be important for applications wherein the total lapsed time is greater than a few hours.

Additionally, the receiving or transmitting system of the TSYNC message can be configured for compensation for communication system or transmission delays. This can be a predetermined or estimated compensation time, based on the system uses or network capabilities a value of 0.1 seconds to compensate for the network delay. This is based on using common Wi-Fi routers where the message delay across such a router using UDP datagrams is between 0.05 to 0.15 seconds. UDP datagrams are lower priority traffic, so some routers buffer them slightly.

Remote (METS) Signal Message (RSIG):

The RSIG message is sent using METS-ITS to any system that is listening for RSIG command. This is typically used by ITS METS to make sure the connection over the network is good to METS-ITS and also to verify that METS-ITS is scanning and listening for METS entries.

Packet length=variable size
Total fields=4
RSIG|FROM|TIME|EOM|

The FROM field is the name set in the ITS Defaults as My Name.

Time Remote (METS) Offset Message (TROFFSET):

The TROFFSET message is sent using METS-ITS interface and communications to a METS system from another ITS system component. This message can be used by METS as a input to adjust manually entered times at the METS system so that the manually entered time is offset or adjusted based on an externally provided estimate or predetermined amount of time as determined by the sending ITS system component.

Packet length=variable size
Total fields=4
TROFFSET|FROM|TIME|EOM|

In this message, the time is the offset set time or the amount of time for the METS system to adjust the manual entered big numbers from the METS terminal clock that is in synchronization due to the receiving of the TSYNC message. The FROM field is the name set of the ITS component originating the TROFFSET message. This can in some embodiments be the name set in the ITS Defaults as My Name.

Lookup Message (LOOKUP):

The LOOKUP message allows a device to request race information from another device. The identifier may be any text. In most cases, the identifier will be a tag serial number, race bib number, participant name, or perhaps a unique identifier that refers to a particular type of information. For example, if an ITS systems needs to know the current duration of a race, the LOOKUP message could be sent to an ITS system that is responsible for tracking the total race time. The identifier field might contain the text entry "RACETIME" and this entry could be used to indicate that the race duration is desired. The packet number field is optional and if not used, the field could contain a single space.

Packet length=variable size
Total fields=6
LOOKUP|FROM|DEST|IDENTIFIER|PACKET #|EOM|

Command Message (COMMAND):

The COMMAND message can be sent to an ITS system to request that a particular command be executed in that ITS system. The IDENTIFIER field may contain any text desired. This field could be used to send any tag reader or participant or tag detector command to a METS device. For example, if the current battery charge level on a METS system needed to determined, a Command message could be sent with the text BATTERYSTATS in the IDENTIFIER field. The METS system would need to have functions built in that can process the command.

Packet length=variable size
Total fields=6
COMMAND |FROM|DEST|IDENTIFIER|PACKET #|EOM|

Request Image Message (RQIMAGE):

The RQIMAGE message is sent to a device to request that a particular image be returned. The message is useful when interfacing with a system that contains photographs or other pictures such as logos or artwork. The IDENTIFIER field should contain a unique descriptor for the image desired and may contain any text desired. Typically, this field will contain a unique number for a participant in an event. However, the IDENTIFIER could also contain a specific location on a METS system where a file is located. The COMPRESSION field may be used to specify the format of the image to be sent. If higher performance across a network is desired, this field might be used to indicate that High compression is desired. The field may contain any text that is recognized by the system designated as DEST. The PACKETSIZE field should contain a value indicating the maximum packet size to send at one time. Given that most images will contain more data than is able to be sent in a single packet, this field may be used to control packet size, thus tuning the network performance. The PSOCKET field is used when it necessary or desired to have multiple packet streams being sent simultaneously from the DEST. For example, the field could contain 7000 on one packet and 7001 on a different packet to indicate that two streams are being used simultaneously.

Packet length=variable size
Total fields=9
RQIMAGE|FROM|DEST|IDENTIFIER|COMPRESSION|PACKE TSIZE|PSOCKET|PACKET #|EOM|

Image Sent Message (STIMAGE):

The STIMAGE message is sent from a system responding to a request for an image, e.g., RQIMAGE. The IDENTIFIER field should contain the unique descriptor for the image that was requested and that may contain any text desired. Typically, this field will contain a unique number for a participant in an event. However, the IDENTIFIER could also contain a specific location on a given system where a file is located. The COMPRESSION field indicates the type of compression used on the image when it was sent. If higher performance across a network is desired, this field might be used to indicate that High compression is desired. The PACKETSIZE field should contain a value indicating the length of the portion of the image just sent. Given that most images will contain more data than can be sent in a single packet, this field will be used to indicate how many bytes have been sent. The PSOCKET field contains a value indicating which stream the information is being sent on. This may be used when it necessary or desired to have multiple packet streams being sent simultaneously from a system. For example, this field could be used to send individual photos to different computers on a network at the same time.

Packet length=variable size
Total fields=9
STIMAGE|FROM|DEST|IDENTIFIER|COMPRESSION|PACKE TSIZE|PSOCKET|PACKET #|EOM|

In other embodiments, the formats of the above or other METS message packet can vary from that described above and herein and still be within the scope of the present disclosure.

ITS-IC Network Interface Design Guidelines

The following can provide additional insight about how to use the METS-ITS Networking Interface.

a) UDP packets are not guaranteed to be delivered on a network, as is the case with TCP. In some networks, routers cannot automatically send UDP packets unless they are configured to do so. For the METS-ITS communication system as described herein, the router should be able to send UDP packets, as well as a broadcast datagram.

b) In some embodiments of the METS-ITS communication system, the ITS system can only process inbound messages while it is connected to the timing system and the ITS system is Enabled and Scanning as addressed above. In such embodiments, if message packets are sent by METS to a METS configured ITS component, such sent message packets will be discarded unless such systems are in the Scanning mode.

c) In some embodiments, the METS remote and or METS configured ITS system can send and receive messages only if configured to do so in the software defaults. As such, the defaults should be set properly and enabling system/software may need to be rebooted after making any changes to ensure that the networking functions have started properly.

d) When METS remote or METS configured ITS system sends a message packet, it can actually send the first packet, wait about 10 milliseconds, and send a second identical packet. Additionally as discussed this can be sent more than two times and the times between the duplicates message packets can vary based on the user and system requirements. This architecture can increase the odds that a packet can reach the destination IP address without having to add the overhead of an acknowledgement message function to the METS protocol. For example, in a METS configured ITS component r application, a filter can be created to identify and discard redundant packets. In other embodiments, the receipt, analysis and management of the redundant METS messages can be managed in other manners as may be desired by the user.

e) In some embodiments, the METS system can be designed to have minimal overhead and functionality. As such, in some embodiments, the METS system or METS configured ITS system component can be configured to ignore any errors. For example, the METS interface or functionality can be configured so that no error messages are sent or initiated if a METS message packet is transmitted or received in an improper format. In such embodiments, the malformed packet can simply be discarded.

f) While the ITS system is scanning for chip reads and METS Read messages, it can check the ITS network packet buffer approximately every 1 to 3 seconds for new messages that have been received. The METS configured ITS components can utilize an automatic load balancing system for packet processing. If the ITS system determines that the chip read and METS read low is lighter than normal, the ITS system can be configured to speed up the processing of inbound TRS chip read and METS read messages. This improve the performance of the ITS system and increase the number of Read message from the TRS systems and the METS remote.

g) When either the METS remote or METS configured ITS system component is transmitting messages to the other ITS METS entities, in some embodiments, such systems cannot process inbound messages until the sending or receiving of the METS messages is completed.

i) In some embodiments, the ITS system components and applications, including the METS system and the METS configured ITS components use one socket for outbound packets, and a different socket for inbound messages. Thus, any METS system application should use the sockets designated in the METS-ITS specification or as defined by the user as addressed later within in this specification. herein.

METS-ITS Interfacing Application Example

The following is pseudo code for creating a METS-ITS UDP client application. This is simply an example of the type of METS-ITS communication code that can be implemented using the METS-ITS system and method as described herein.

```
int main( )
{
  int socketnum;
  struct socketnumaddress_in_server_address;
  struct hostloc *host;
  char packet_data[128];
  host = (struct hostloc *) gethostbyname((char *)"192.168.1.255");
  server_address.sin_family = AF_INET;
  server_address.sin_port = htons(6002);
  server_address.sin_addr = *((struct in_addr *)host->h_addr);
  bzero(&(server_address.sin_zero),8);
  while (True)
  {
    printf("Type EXIT when done.");
    gets(packet_data);
    if ((strcmp(packet_data, "EXIT") == 0))
    {
      printf("Program done.");
      exit;
    }
    sendto(socketnum, packet_data, strlen(packet_data), 0,(struct socketnumaddress*)&server_addr,
      sizeof(struct socketnumaddress));
  }
}
```

Troubleshooting METS-ITS Interface

When a implementation problem in a METS-ITS system or method is encountered, the following can be reviewed:

a) Make sure that any network interface is working properly.

b) Verify that any implementing METS-ITS application has permission to send and receive network packets.

c) Determine if the implemented router allows UDP packets to be sent through it.

d) Make sure that any sockets contain the proper values for interfacing with METS.

e) Utilize a network protocol analyzer that is designed to be used with the METS and/or ITS system to confirm that METS packets are being sent.

f) Be sure to include calls to the operating system that allow it to process application events.

g) Check any implementing METS ITS system software code to verify that inbound packets are being requested in a timely manner.

h) Make sure to design the ITS component based METS application is configured to manage any METS remote originated redundant messages/packets.

i) Make sure the METS system is not listening for messages/packets with multiple applications on the same computer using the same socket value.

j) Always check to make sure all bytes in the message packet were transmitted correctly.

k) Verify that another program on any computer isn't already using the designated socket values.

l) Make sure the Firewall can allow the sending and receiving of UDP packets.

m) Verify that any receive buffers are large enough to handle all inbound messages.

METS and METS-ITS Computer Operating Environment

Referring to FIG. 10, an operating environment for an illustrated embodiment of one or more tag readers, or participant/tag detection system and supporting timing systems as described herein is a computer system 700 with a computer 702 that comprises at least one high speed central processing unit (CPU) 704, in conjunction with a memory system 706 interconnected with at least one bus structure 708, an input device 710, and an output device 712. These elements are interconnected by at least one bus structure 708. As addressed above, the input and output devices can include a communication interface including an antenna interface. Any or all of the computer components of the ITS system including the METS-ITS network interface and communications systems and methods can be any computing device including, but not limited to, a lap top, PDA, Cell/mobile phone, as well as potentially a dedicated device. The software can be implemented as any "app" thereon and still be within the scope of this disclosure.

The illustrated CPU 704 for an METS-ITS, tag reader or detection system is of familiar design and includes an arithmetic logic unit (ALU) 714 for performing computations, a collection of registers for temporary storage of data and instructions, and a control unit 716 for controlling operation of the computer system 700. Any of a variety of processors, including at least those from Digital Equipment, Sun, MIPS, Motorola, NEC, Intel, Cyrix, AMD, HP, and Nexgen, is equally preferred but not limited thereto, for the CPU 704. This illustrated embodiment operates on an operating system designed to be portable to any of these processing platforms.

The memory system 706 generally includes high-speed main memory 720 in the form of a medium such as random access memory (RAM) and read only memory (ROM) semiconductor devices that are typical on a METS-ITS, tag reader or detection system. However, the present disclosure is not limited thereto and can also include secondary storage 722 in the form of long-term storage mediums such as floppy disks, hard disks, tape, CD-ROM, flash memory, etc., and other devices that store data using electrical, magnetic, and optical or other recording media. The main memory 720 also can include, in some embodiments, a video display memory for displaying images through a display device (not shown). Those skilled in the art will recognize that the memory system 706 can comprise a variety of alternative components having a variety of storage capacities.

Where applicable, an input device 710, and output device 712 can also be provided in the METS-ITS, tag reader or detection system. The input device 710 can comprise any keyboard, mouse, physical transducer (e.g. a microphone), and can be interconnected to the computer 702 via an input interface 724, such as a graphical user interface, associated with or separate from the above described communication interface including the antenna interface for wireless communications. The output device 712 can include a display, a printer, a transducer (e.g. a speaker), etc., and be interconnected to the computer 702 via an output interface 726 that can include the above described communication interface including the antenna interface. Some devices, such as a network adapter or a modem, can be used as input and/or output devices.

As is familiar to those skilled in the art, the computer system 700 further includes an operating system and at least one application program. The operating system is the set of software that controls the computer system's operation and the allocation of resources. The application program is the set of software that performs a task desired by an ITS user, using computer resources made available through the operating system. Both are typically resident in the illustrated memory system 306 that may be resident on the METS-ITS, tag reader or detection system.

In accordance with the practices of persons skilled in the art of computer programming, the present disclosure is described below with reference to symbolic representations of operations that are performed by the computer system 700. Such operations are sometimes referred to as being computer-executed. It will be appreciated that the operations that are symbolically represented include the manipulation by the CPU 704 of electrical signals representing data bits and the maintenance of data bits at memory locations in the memory system 706, as well as other processing of signals. The memory locations where data bits are maintained are physical locations that have particular electrical, magnetic, or optical properties corresponding to the data bits. One or more embodiments can be implemented in tangible form in a program or programs defined by computer executable instructions that can be stored on a computer-readable medium. The computer-readable medium can be any of the devices, or a combination of the devices, described above in connection with the memory system 506.

METS Exemplary Operation within an ITS System

In some embodiments, if the communication network at the METS remote is down or not being used, the METS manual entry is not added to the network buffer and no check for timeout occurs. Instead, the METS manual entry is stored in the data store and control returns to the Wait for Data Entry mode.

In some embodiments, there can be two or more READ messages. For example, one READ message can be provided where the tag number is manually entered and a second READ message can be provided where a name of participant is manually entered. Other READ messages are also possible. In such embodiments, one or more READ messages are created by the system responsive to a user manually entering simply a tag number or a user name when monitoring that user passing a user monitored point or line on the course and as such the system adds the time entry or stamp in the time field (after the below adjustment) to the READ message after the ID is manually entered and validated. The system creates the READ message when a bib number is manually entered, or when the system does an electronic read on a tag.

When the ITS system or METS system validates the entered data, the system ensures that it is a valid serial number. The system can validate the format only or can compare the actually entered number to a stored list or database of numbers for that particular event. If the later, then the METS can be pre-configured for that event with a list or database of valid tab or serial numbers. Therefore, the METS procedures can provide for pre-race or use configuration. For some events, the METS pre-configuration can simply take the serial number at faith and assume it will be valid. In other situations, the ITS system includes a database loaded on two or more systems that will verify that the number passed is valid and contained in the database.

The time field is identified as being the system clock of the TRS making the time read, but is actually the adjusted time (See FIG. 3 and corresponding text item (C) that takes the system clock time at the time of manual entry of the ID. The user does not have to enter a time as the system time stamps the entry when entered. As such, the user backup entry enables a user to manually enter, at a monitored location, such as the finish line, to enter a tag number, bib number or the like ID, the system receives that entry, time stamps the entry with a system time, validates the ID entry, adjusts the time stamp and then creates a READ message. In some embodiments, time adjustments can be made by the system depending on parameters set by the user. For instance, a user can tell the system to adjust time for electronic entries, but not manual entries or for manual entries, but not electronic entries, or to adjust all entries.

In operation, there can be a natural variation of when the person crosses the manually monitored reference line, another reference line, and also the manual users ability to manually enter the bib or tag number or name, or if an error to reenter it. The adjust time (FIG. 3, item (c)) system function adjusts the time stamp on the manual entry before creating the READ message to compensate for the variations, based on some predetermined factors. In one embodiment, a time compensation can be first set by the user and may be anything from perhaps −1 seconds to −10 seconds, e.g., a positive value from 1 to 10 seconds. In other embodiments, the system can monitor events or times and be configured for calculating a time compensation based on algorithm or data based on operational events of the system over time.

The variance in the read rate occurs because of numerous factors, but typically, it has to do with the fact that race participants fail to follow the guidelines for wearing the chip properly. Thus, for a 10K race with perhaps 500 participants, the user might experience chip reads for 490 to 500 runners.

Given that a few chips may not read successfully, the METS system with the METS remote and METS configured ITS components provide that the manually entered bib numbers or participant names are provided to the ITS system along with the TRS automated RFID tag reads. Recall that when runners cross the monitored point, their bib number scrolls on the screen. If a user sees a runner cross the monitored point, and no bib number appears, the user can manually enter the bib number. This allows the user to capture the time for that individual.

In addition, the user can use the METS system or software embodiment thereof at a location behind the finish line when using a single ITS. The METS software allows the user to manually key in bib numbers for race participants and have that information sent automatically over a Wi-Fi network to the ITS. If the ITS system missed a chip read, the METS provides for the ability to receive a user's manual entry of the time for that missed chip read.

Triple Redundancy Exemplary Embodiment Using ITS with METS

In FIG. 2, there are two sets of timing antennas at a finish line. This is a common redundant RFID reader configuration using two ITS systems. Most timing systems rely on redundancy to provide maximum read success. The ITS system can provide the same approach but as described here, this can be further improved or enhanced with the addition of the METS system and integration of the METS interface and manual tag reads into the ITS system.

By using two ITS systems with 8 total antennas, the user can maximize the user's chances of successfully reading every chip. The first set of antennas is placed at the finish line, and the second set is placed approximately 25 to 35 feet behind the finish line. the ITS software has a feature called Reader Offset (described in Section 4) that will automatically adjust the time for a runner that crosses the second set of antennas.

For example, if it is assumed that the user has a 10K race with 1,000 runners, the first ITS system is at the finish line and is operating at a read efficiency of 96%. Thus, 960 chips will be read at the finish line. However, 40 of the chips were not read for some unknown reason. The second the ITS system is operating at an efficiency of 98%, so 980 chips are read at this point. The 40 chips that were not read at the finish line are likely to be read at the backup ITS. In other words, the missed chips at the backup system are not likely to be the same chips that were missed at the finish line. In our exhaustive engineering tests in our lab, as well as at actual races, the inventor hereof has found that this solution works well and most working chips will be read by one of the two ITS. If the user has a large race and the user need to improve the users read results, the user should use redundant systems. In summary for this example, by using redundant systems the user should be able to improve the users read success. Again, this assumes that the bibs are worn properly and the chips are placed correctly on the bibs. This also assumes that chips are not damaged or missing.

Depending on the size of the race, and the user's desire for maximum read success, the user can decide if the additional costs for redundancy are worth it for the race. If the user is timing a small race with perhaps 500 participants, it might not be worth the additional setup time or costs. If the user is timing a Marathon with perhaps 5,000 runners, the user should use a redundant configuration. Keep in mind one of the greatest advantages of redundant systems; if the hardware would fail for any reason at the user's finish line during the race, the user has a second system recording their chip times. This redundancy feature of the platform can be very beneficial.

In addition to the hardware redundancy, the ITS system has been provided with a powerful capability for capturing bib numbers when a chip cannot be read.

The ITS system not only collects electronic read times for timing chips; it displays the chip numbers being read in real time on the computer screen. On the main screen of the software, the user will see a window called Bib History. As chips are being read, their number will scroll in this window, allowing the user to confirm that the chip was read successfully.

As the ITS system is reading, the user can have someone on the user's race staff monitor the read rates and confirm that all chips are read successfully as runners cross the finish line. If a runner crosses, and no read occurs, the user can quickly type in the bib number for that individual and the time will be captured, just as if the chip had been read. This is a very powerful feature of our system. No matter how many times the user tells runners to wear their bibs in front at chest height, someone will remove their shirt or wear the bib on the back of their running shorts! When this occurs, the system still has a very good chance of reading the chip. However, if the chip is not read, the user can now enter their bib number manually and capture their time. As mentioned in the previous section, the user can also use the METS system software to provide even more redundancy.

Example of Redundancy Using METS for Timing a Race

1. Race day is approaching and the user want to maximize the chances of collecting the timing information for each participant. If the system is properly configured and the race participant is wearing the chip correctly, the user will have a good read rate and most of the timing chips will be read electronically. However, there are many reasons why a chip may not be read, and that is why the user want to maximize the results by using a strategy of redundancy. A user of the ITS system should never time a race without having a solid plan for redundancy. The present ITS system can include various systems and methods for achieving redundancy.

2. Use a second ITS as a backup, perhaps at the finish line. The ITS system has built-in capabilities that make this easy to implement, and it works remarkably well. Prior art provides for the required use of redundant controllers and mats to maximize the chance of reading the timing chips. The ITS system offers the same type of electronic redundancy. If the user only owns one ITS system, the following options will work very well for you.

3. Use the manual bib number entry mode on the main screen of the ITS. If the user is timing at the finish line, set the Scan Rate to 1 second and as participants cross the finish line, the user can type in any bib numbers that were not read electronically. This works quite well for races with up to perhaps 750 participants. Hint: If the user cannot type in a bib number, the user can still hit the Enter key and a manual time will be inserted into the Output File. The user can then use the Missing Chip Report in combination with the bib pull chips to determine the participant, after which the user can edit their finish time in the database.

4. Remove the pull chips at the back of the finish chute and place them on a stringer. After the race has completed, use the Overall Finish Report to compare the electronic results with the pull chips on the stringer. When the user find a pull chip with no corresponding time in the report, simply edit the database for that participant and put in their estimated finish time based on their position in the report.

5. Use the METS system software that may have come with the ITS, depending on the configuration. This software can be loaded on as many laptops as the user like, and it is very easy to use as a redundant data entry system at the back of the finish chute. This software will allow the user to key in the bib numbers for all race participants. The user can then look up any bib number in the software to find the finish time for a bib that was not read electronically by the ITS at the finish line. The METS software can also send the manual entries over a network (Wi-Fi) to the ITS at the finish line. If the ITS missed a read, it will use the manual entry. Hint: Make sure the time on all the computers is the same. Time synchronization is desired to make sure all chip times, whether electronic or manual, are accurate. ITS can automatically Synchronize the METS laptops with the same time.

6. Load a copy of the ITS software on a second or third laptop and use it as a manual data entry tool.

When the user loads a METS remote component such as a laptop, the user should be sure to update the Defaults. The user don't have to set file names for the Age Group, Division, or Database on the backup computer because this information should already loaded on the main ITS. However, the user will need to set the name for the Race Output File since the ITS system may write the manual entries to that file. Also, make sure that the user set the Database Mode to the proper setting. Once the defaults are set, the user is ready to go. Load the ITS software again to make sure the Defaults are used, and verify on the main screen that the user has an Output File open. Also, verify that the Database Mode is set properly. Now begin entering bib numbers into the Bib # Entry box on the screen.

For example, where the user is using as a backup entry system at his or her finish line, the user enters bib numbers, the Output File will be updated with the time on the laptop computer and the database finish column will be updated for each bib the user enter. The user should periodically save the database, since no automatic saves are made since the user is not actually communicating with any timing hardware. After the race is over, save the database one last time. The user now has times in the finish column of the database on the backup computer. The user can now use the Merge feature in the Race Database screen on the main ITS, and merge the backup times into the main database at the finish line. The user may need to copy the database file on the backup computer over to the finish line system, and the user can do this quickly with a USB Thumb/Flash Drive.

Be sure to save the database on the main ITS before doing a Merge. If the user makes a mistake during the merge process, the user can re-load the database prior to the merge. Also, when using manually as a backup system, make sure the file names for the Output File and Database Files are different than the names at the main ITS. This will prevent any confusion.

As the user will see, there are numerous ways the user can use to maximize the race timing results.

In some embodiments, the preferred method for redundancy is to use multiple ITS systems at a monitored point. However, when that is not possible, manual backups will help the user considerably.

The ITS system is designed with multiple levels of redundancy. First, the user has a system at the finish line. Second, the user can have another ITS system just behind the finish line. Third, the user can have a staff member type in any bib numbers that were not read automatically by the system. By leveraging this triple redundancy capability, the user can improve the user's race success.

As described herein, the METS capable ITS system includes a communication architecture for bi-directional timing systems communications as well as broadcast standard timing between multiple implementing interfaces over a data communication network. One or all of the METS-ITS systems may be separate ITS systems wherein the METS capable ITS system enables each to share its sports timing system data and participant information with the other systems.

As described herein, the METS system includes the METS to ITS communication protocol and communication messaging structure. Some of these ITS system can include systems that detect and collect the participant data. Some of the METS-ITS systems may not be ITS systems but may be systems or applications that can be considered sports timing auxiliary systems (STAS) in that they provide auxiliary applications that can utilize the METS-ITS communications for providing real-time sport or event or participant related services including real-time participant and event information collection and reporting and event and participant focused services.

The METS is a software-based system that provides the ability to remotely capture times for race participants through manual data entry, and to provide those participant times to an RFID system for the purposes of generating backup data in case an RFID timing system at a monitored location was unsuccessful at reading an RFID tag on the event participant. The capabilities of the METS can include one or more advantages over the prior systems. This can include a manual entry system that can be used remotely from the ITS system but that interfaces with existing RFID timing systems to provide manual backup entries of participants in a sporting event. This can also include a remote capability to capture race times for participants in locations where an RFID timing system may not be desired or feasible. This can also include providing support for numerous types of communications networks in providing such remote manual entry of manually detected race events. The METS system has been described to utilize well-established communication protocols including, but not limited to, TCP/IP or UDP. In some embodiments, the METS system provides the ability to capture and record manually entered race events or bib numbers in an offline mode that can be stored where there is no currently available communications link or network with the timing system. In some embodiments, the METS system utilizes a standard text messaging protocol that can be interfaced with third-party software programs for enhancing their functionality and capabilities. As described, the METS system can be implemented as multiple installations that can operate simultaneously in order to support large events with a high density of participants. In some embodiments, the METS system has the capability to adjust a manually entered event time to account for the location or speed or movement associated with the device or object or person being monitored so that the manually entered time at the METS system better matches the time an RFID tag would have been read by one or more RFID tag reader systems in the ITS system. Of course other advantages should be known to one or skill in the art after having read the present specification.

ITS Remote or METS systems and software and methods provides a convenient tool for manually entering race participants into the ITS software. The software is ideal for use at the finish line of a race as a backup for the electronic timing system. In addition, ITS METS can be used at a split or monitored point anywhere on the course where the user wish to gather timing information.

When the user uses ITS METS, the user will be entering the bib number on the race participant and the time will be recorded into an Output file that can be imported into the ITS software at the finish line. The Output file created by METS is similar to the standard Output file created in ITS. Thus, the ITS system METS's Output file looks just like a second ITS system. Not only can the ITS METS software be imported into ITS, it can be read by a spreadsheet program as well.

ITS METS can also send the participant information the user manually enter over a Wi-Fi network to the ITS at the finish line. This minimizes the need for using the Output file and importing it into the ITS. In short, the METS software can send race data over the network and update the race results in nearly real-time.

While the METS was designed for sporting events, it could be used for any number of other applications. Furthermore, while the system will be described in conjunction with the current embodiments, it will be understood that they are not intended to limit the system to these embodiments. On the contrary, the current design is intended to cover alternatives, modifications and equivalents, which may be included within the spirit and scope of the system.

When describing elements or features and/or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

Those skilled in the art will recognize that various changes can be made to the exemplary embodiments and implementations described above without departing from the scope of the disclosure. Accordingly, all matter contained in the above description or shown in the accompanying drawings should be interpreted as illustrative and not in a limiting sense.

It is further to be understood that the processes or steps described herein are not to be construed as necessarily requiring their performance in the particular order discussed or illustrated. It is also to be understood that additional or alternative processes or steps may be employed.

What is claimed is:

1. A system for timing of a passing of an object past a monitored location where the monitored location is being monitored by a timing system having at least one automated object detection system for wirelessly detecting the passing of the object at the monitored location; the system comprising:

a remote entry computer system having a processor for executing computer executable instructions, a clock for determining a present time, a user interface for receiving user input data, a memory being a computer readable medium storing the computer executable instructions and the received user input data, and a communications interface for communicating with the timing system, the remote entry computer system being positionable at a current location selected from among a plurality of potential locations each of which is set apart and different than the monitored location at which the automated object detection system is located, wherein the remote entry computer system has computer readable medium including the computer executable instructions for performing the actions of:

storing in the memory an offset time value;

receiving the user input data at the user interface;

receiving from the clock a user data input time associated with the receipt of the received user input data at the user interface;

determining a remote time value from the received user data input time, the remote time value being indicative of a time of passing of the object at the set apart current location of the remote entry computer system;

determining an adjusted time value from the determined remote time value and the stored offset time value, the adjusted time value as compared to the user data input time being indicative of a time of passing of the object at the monitored location even though determined by the remote entry computer from the user data input time located at the set apart current location of the remote entry computer system;

storing the received user input data and the determined adjusted time value in the memory;

creating a remote user data message including the received user input data and the determined adjusted time value; and transmitting the remote user data message over the communications interface to the timing system.

2. The system of claim 1 wherein the user interface is configured for receiving the offset time value that is subsequently stored in the memory.

3. The system of claim 1 wherein the remote entry computer system further includes a GPS receiver for determining the set apart current location of the remote entry computer system, wherein the computer executable instructions further include performing the action of determining the offset time value based on the determined set apart current location.

4. The system of claim 3 wherein the memory includes a stored GPS location of the monitored location and wherein the determining of the offset time value is based on the stored GPS location of the monitored location.

5. The system of claim 1 wherein the communication interface is configured for receiving from the timing system over the communication interface the offset time value that is subsequently stored in the memory.

6. The system of claim 5 wherein the communication interface receives a plurality of offset timing values from the timing system, each of the received plurality of offset timing values being stored in the memory, further comprising determining an applicable one of the received and stored offset timing values to be used in the determining of adjusted time value as a function of a performance, speed, acceleration, deceleration of one or more objects, a current time as received from the clock as compared to a predetermined event time as stored in the memory, or in response to receiving an instruction from the timing system.

7. The system of claim 1 wherein the communication interface is configured for receiving a clock synchronization message including a system time value from the timing system, and wherein the clock is configured to set the present time of the clock to the value of the received system time value.

8. The system of claim 1 wherein the communication interface is configured to receive a verification message from the timing system indicative of a currently available active communication link therebetween, wherein the computer executable instructions include the actions of:

creating a verification response message in response to receiving the verification message, the verification response message being indicative of the remote entry computer's receipt of the verification message from the timing system; and transmitting the verification response message over the communication interface to the timing system after the creating thereof.

9. The system of claim 1 wherein the user interface includes a key pad and wherein the user input data is selected from the group consisting of an identification number associated with the object and a name associated with the object.

10. The system of claim 1 wherein the user input data includes an identification number associated with the object, wherein the user interface includes a display, wherein the computer executable instructions include instructions for performing the action transmitting an image request message including the identification number over the communication interface requesting an image file associated with the identification number;

receiving an image message including the requested image file over the communication interface; and displaying on the display of the user interface an image contained in the received image file.

11. The system of claim 1 wherein the communication interface is a wireless interface for wirelessly communicating with the timing system.

12. The system of claim 1 wherein the user data message is a state-less UDP message and the communication interface is a state-less UDP network interface.

13. The system of claim 12 wherein the computer executable instructions in include performing the actions of:

determining a lapse of time since the transmitting of the user data message; and retransmitting the user data message over the communications interface after the determined lapse of time has met or exceeded a predetermined period of time.

14. The system of claim 1 wherein the remote entry computer system is selected from the group consisting of a laptop computer, a smart phone and a tablet PC.

15. The system of claim 1 wherein the computer executable instructions further include performing the actions of:

detecting a current inability of communicating with the timing system over the communication interface;

suppressing the transmitting of the user data message in response to the detecting of the current inability to communicate;

monitoring the status of the communication interface to determine a renewed ability to communicate with the timing system over the communication interface; and identifying the renewed ability to communicate with the timing system, wherein transmitting occurs after the identification of the renewed ability to communicate.

16. The system of claim 1 wherein the timing system is a sports timing system and wherein the object is an RFID tag associated with a participant in a timed sporting event and the automated object detection system is an RFID detection system for detecting the passing of the RFID tag at the monitored location.

17. A system for timing of a passing of an object past a monitored location, the system comprising:

a computer-implemented timing system having a data interface for communicating over a data communication network, a memory with executable instructions for operating the data interface to communicate and for storing an identification of the timing system, event data, and object data, the object data including an object identifier for uniquely identifying each object and object timing data including one or more object timing values, and a processor coupled to the memory and the data interface for executing the executable instructions for operating the data interface to communicate messages over a stateless packet data communication network;

an object detection system communicatively coupled to the timing system and positioned at the monitored location, the object detection system having a processor, memory and communication interface; and at least one antenna for wirelessly detecting a passing of the object by the monitored location; and a remote entry computer system having a processor for executing computer executable instructions, a clock for determining a present time, a user interface for receiving user input data, a memory being a computer readable medium storing the computer executable instructions and the received user input data, and a communications interface for communicating with the timing system, the remote entry computer system being positionable at a current location selected from among a plurality of potential locations each of which is set apart and different than the monitored location at which the object detection system is located wherein the having computer readable medium including the computer executable instructions for performing the actions of:

receiving the user input data at the user interface;

receiving from the clock a user data input time associated with the receipt of the received user input data at the user interface;

determining a remote time value from the received user data input time, the remote time value being indicative of a time of passing of the object at the set apart current location of the remote entry computer system;

storing the received user input data and the determined remote time value in the memory;

creating a remote user data message including the received user input data and at least one of an adjusted time value and the remote time value;

transmitting the user data message over the communications interface to the timing system;

wherein the timing system receives the transmitted user data message over the timing system data interface and wherein the received user input data is the object identifier, wherein at least one of the timing system and the remote entry computer system stores an offset time value; and determining by at least one of timing system and the remote entry computer system the adjusted time value responsive to the determined remote time value and the stored offset time value.

18. The system of claim 17 wherein the computer executable instructions of the remote entry computer system include performing the actions of:

storing in the memory of the remote entry computer system the offset time value; and wherein determining the adjusted time value includes determining by the remote entry computer system the adjusted time value as a function of the determined remote time value and the stored offset time value, wherein the creating of the received user data message includes the determined adjusted time value and wherein the timing system stores the received adjusted time value as one of the object timing values within the object timing data.

19. The system of claim 18 wherein the communication interface of the remote entry computer system is configured for receiving the offset time value that is subsequently stored in the memory.

20. The system of claim 18 wherein the remote entry computer system further includes a GPS receiver for determining the set apart current location of the remote entry computer system, wherein the computer executable instructions further include performing the action of determining the offset time value based on the determined set apart current location.

21. The system of claim 20 wherein the remote entry computer system memory includes a stored GPS location of the monitored location and wherein the determining of the offset time value is based on the stored GPS location of the monitored location.

22. The system of claim 18 wherein the timing system determines the offset time value, creates a message including the determined offset time value, and transmits a message to the remote entry computer system including the offset time value,
wherein the communication interface of the remote entry computer system is configured for receiving the message containing the offset time value and stores the received offset time value in the memory of the remote entry computer system.

23. The system of claim 22 wherein the timing system determines the offset time value as a current dynamic offset time value from among a plurality of changing offset time values as a function of a parameter selected from the group consisting of a distance between the remote entry computer system and the monitored location; a determined speed of one or more objects passing the monitored location; a determined change in speed of one or more objects passing the monitored location, and a determined current time period of a timed event.

24. The system of claim 18 wherein the object detection system determines the offset time value, creates a message including the determined offset time value, and transmits a message to the remote entry computer system including the offset time value,
wherein the communication interface of the remote entry computer system is configured for receiving the message containing the offset time value and stores the received offset time value in the memory of the remote entry computer system.

25. The system of claim 24 wherein the timing system determines the offset time value as a current dynamic offset time value from among a plurality of changing offset time values as a function of a parameter selected from the group consisting of a distance between the remote entry computer system and the monitored location; a determined speed of one or more objects passing the monitored location; a determined change in speed of one or more objects passing the monitored location; and a determined current time period of a timed event.

26. The system of claim 17 wherein at least one of the timing system and the object detection system is configured for generating a clock synchronization message, and wherein the communication interface of the remote entry computer system is configured for receiving the clock synchronization message including a system time value from the timing system, and wherein the clock is configured to set the present time of the clock to the value of the received system time value.

27. The system of claim 17 wherein at least one of the timing system and the object detection system is configured for generating a verification message indicative of a currently available active communication link therebetween, wherein the communication interface of the remote entry computer system is configured to receive a verification message, wherein the computer executable instructions of the remote entry computer system include the actions of:
creating an verification response message in response to receiving the verification message, the verification response message being indicative of the remote entry computer's receipt of the verification message; and
transmitting the verification response message over the communication interface after the creating thereof.

28. The system of claim 17 wherein the user interface of the remote entry computer system includes a key pad and wherein the user input data is selected from the group consisting of an identification number associated with the object and a name associated with the object.

29. The system of claim 17 wherein the user input data of the remote entry computer system includes an identification number associated with the object, wherein the user interface includes a display, wherein the computer executable instructions include instructions for performing the actions of:
transmitting an image request message including the identification number over the communication interface of the remote entry computer system requesting an image file associated with the identification number;
receiving at the timing system the image request message;
transmitting an image message containing the requested image file by the timing system;
receiving the image message at communication interface of the remote entry computer including the requested image file over the communication interface; and
displaying on the display of the user interface of the remote entry computer system an image contained in the received image file.

30. The system of claim 17 wherein the communication interface of the remote entry computer system is a wireless interface for wirelessly communicating with the timing system and wherein at least one of the data interface of the timing system and the communication interface of the object detection system include a wireless interface for communicating with the wireless interface of the remote entry computer system.

31. The system of claim 30 wherein the wireless interface is a Wi-Fi interface.

32. The system of claim 17 wherein the user data message is a state-less UDP message and the communication interface of the remote entry computer system is a state-less UDP network interface.

33. The system of claim 32 wherein the computer executable instructions of the remote entry computer system include performing the actions of:
determining a lapse of time since the transmitting of the user data message; and
retransmitting the user data message over the communications interface after the determined lapse of time has met or exceeded a predetermined period of time.

34. The system of claim 17 wherein the remote entry computer system is selected from the group consisting of a laptop computer, a smart phone and a tablet PC.

35. The system of claim 17 wherein the computer executable instructions of the remote entry computer system include performing the actions of:
detecting a current inability of communicating with the timing system over the communication interface;
suppressing the transmitting of the user data message in response to the detecting of the current inability to communicate;

monitoring the status of the communication interface to determine a renewed ability to communicate with the timing system over the communication interface; and identifying the renewed ability to communicate with the timing system, wherein transmitting occurs after the identification of the renewed ability to communicate.

36. The system of claim 17 wherein the timing system is a sports timing system and wherein the object is an RFID tag associated with a participant in a timed sporting event and the object detection system is an RFID detection system for detecting the passing of the RFID tag at the monitored location.

37. The system of claim 18 wherein the communication interface of the remote entry computer system receives a plurality of offset timing values from the timing system, each of the received plurality of offset timing values being stored in the memory, further comprising determining an applicable one of the received and stored offset timing values to be used in the determining of the adjusted time value as a function of a performance, speed, acceleration, deceleration of one or more objects, a current time as received from the clock as compared to a predetermined event time as stored in the memory, or in response to receiving an instruction from the timing system.

\* \* \* \* \*